(12) United States Patent
Aldhaher

(10) Patent No.: US 12,136,827 B2
(45) Date of Patent: Nov. 5, 2024

(54) AUXILIARY INVERTER FOR USE WITH A MAIN INVERTER OF A TRANSMITTER OF A WIRELESS POWER TRANSFER SYSTEM

(71) Applicant: Solace Power Inc., Mount Pearl (CA)

(72) Inventor: Samer Aldhaher, Mount Pearl (CA)

(73) Assignee: Solace Power Inc., Mount Pearl (CA)

( * ) Notice: Subject to any disclaimer, the term of this patent is extended or adjusted under 35 U.S.C. 154(b) by 179 days.

(21) Appl. No.: 17/669,002

(22) Filed: Feb. 10, 2022

(65) Prior Publication Data

US 2022/0255357 A1 Aug. 11, 2022

Related U.S. Application Data

(60) Provisional application No. 63/147,941, filed on Feb. 10, 2021.

(51) Int. Cl.
*H02J 50/12* (2016.01)
*H02M 1/00* (2007.01)

(52) U.S. Cl.
CPC ........... *H02J 50/12* (2016.02); *H02M 1/0009* (2021.05); *H02M 1/0058* (2021.05)

(58) Field of Classification Search
CPC ............ H02J 50/12; H02J 50/05; H02J 50/10; H02M 1/0009; H02M 1/0058; H02M 7/537; H02M 7/4815
See application file for complete search history.

(56) References Cited

U.S. PATENT DOCUMENTS

| | | | | |
|---|---|---|---|---|
| 11,218,026 B1 * | 1/2022 | Hansen | ............... | H02M 3/01 |
| 11,862,993 B1 * | 1/2024 | Inoue | ................ | B60L 53/12 |
| 2017/0207723 A1 * | 7/2017 | Zhang | ............... | H02M 1/12 |
| 2017/0237340 A1 * | 8/2017 | Long | ................ | H02M 1/4258 307/82 |
| 2018/0212463 A1 * | 7/2018 | Van Boheemen | ...... | H02J 50/80 |
| 2018/0351473 A1 * | 12/2018 | Zhang | ............... | H02M 3/1584 |

FOREIGN PATENT DOCUMENTS

| | | | | |
|---|---|---|---|---|
| CN | 109103972 A | * | 12/2018 | ............ H02J 5/005 |
| WO | WO-2020106410 A2 | * | 5/2020 | ............ B60L 50/60 |
| WO | WO-2020134230 A1 | * | 7/2020 | ........... B60L 53/122 |
| WO | WO-2021027823 A1 | * | 2/2021 | ............ B60L 53/12 |

* cited by examiner

*Primary Examiner* — Jared Fureman
*Assistant Examiner* — Michael J Warmflash
(74) *Attorney, Agent, or Firm* — Harness, Dickey & Pierce, P.L.C.

(57) ABSTRACT

An auxiliary inverter for use with a main inverter of a transmitter of a wireless power transfer system comprises: a coupling element; an output network electrically connected to the coupling element; and an adjustable power source electrically connected to the coupling element via the output network, an input voltage to the coupling element based on a detected signal. The coupling element is configured to induce a voltage in the main inverter of the transmitter of the wireless power transfer system to manage reflected impedance at the main inverter. The induced voltage is based on the input voltage to the coupling element.

19 Claims, 17 Drawing Sheets

AUXILIARY INVERTER FOR USE WITH A MAIN INVERTER OF A TRANSMITTER OF A WIRELESS POWER TRANSFER SYSTEM

CROSS-REFERENCE TO RELATED APPLICATION

The subject application claims the benefit of U.S. Provisional Application No. 63/147,941 filed on Feb. 10, 2021, the entire content of which is incorporated herein by reference.

TECHNICAL FIELD

The subject disclosure relates generally to wireless power transfer, and in particular, to an auxiliary inverter for use with a main inverter of a transmitter of a wireless power transfer system, and a method therefor.

BACKGROUND

Wireless charging and wireless power transfer systems are becoming an increasingly important technology to enable the next generation of devices. The potential benefits and advantages offered by the technology are evident by the increasing number of manufacturers and companies investing in the technology.

A variety of wireless power transfer systems are known. A typical wireless power transfer system includes a power source electrically connected to a wireless power transmitter, and a wireless power receiver electrically connected to a load.

In magnetic induction systems, the transmitter has a coil with a certain inductance that transfers electrical energy from the power source to a receiving coil with a certain inductance. Power transfer occurs due to coupling of magnetic fields between the inductors of the transmitter and receiver. The range of these magnetic induction systems is limited, and the inductors of the transmitter and receiver must be in optimal alignment for power transfer.

There also exist resonant magnetic systems in which power is transferred due to coupling of magnetic fields between the inductors of the transmitter and receiver. However, in resonant magnetic systems the inductors are resonated using at least one capacitor. In resonant magnetic systems, the transmitter is self-resonant and the receiver is self-resonant. The range of power transfer in resonant magnetic systems is increased over that of magnetic induction systems and alignment issues are rectified. While electromagnetic energy is produced in magnetic induction and resonant magnetic systems, the majority of power transfer occurs via the magnetic field. Little, if any, power is transferred via electric induction or resonant electric induction.

In electric induction systems, the transmitter and receiver have capacitive electrodes. Power transfer occurs due to coupling of electric fields between the capacitive electrodes of the transmitter and receiver. Similar, to resonant magnetic systems, there exist resonant electric systems in which the capacitive electrodes of the transmitter and receiver are made resonant using at least one inductor. In resonant electric systems, the transmitter is self-resonant and the receiver is self-resonant. Resonant electric systems have an increased range of power transfer compared to that of electric induction systems and alignment issues are rectified. While electromagnetic energy is produced in electric induction and resonant electric systems, the majority of power transfer occurs via the electric field. Little, if any, power is transferred via magnetic induction or resonant magnetic induction.

Although wireless power transfer techniques are known, improvements are desired. It is therefore an object to provide a novel wireless power transfer system, a transmitter and receiver therefor and a method of wirelessly transmitting power.

This background serves only to set a scene to allow a person skilled in the art to better appreciate the following description. Therefore, none of the above discussion should necessarily be taken as an acknowledgement that that discussion is part of the state of the art or is common general knowledge. One or more aspects/embodiments of the invention may or may not address one or more of the background issues.

BRIEF DESCRIPTION

It should be appreciated, that the following brief description is provided to introduce a selection of concepts in a simplified form that are further described below in the detailed description. This brief description is not intended to be used to limit the scope of claimed subject matter.

Accordingly, in one aspect there is provided an auxiliary inverter for use with a main inverter of a transmitter of a wireless power transfer system. The auxiliary inverter may provide a more robust transmitter and/or wireless power transfer system. The auxiliary inverter may manage reflected reactance at a main inverter. The auxiliary inverter may ensure a main inverter of a transmitter of a wireless power transfer system operates at optimum conditions. The auxiliary inverter may ensure a main inverter of a transmitter of a wireless power transfer system operates at zero voltage switching (ZVS).

For the purposes of the subject disclosure, ZVS is switching of a transistor from an off state to an on state when the voltage across the transistor is zero. Consequently, there is no energy lost during this transition from the off to the on state. In practice, there is some energy lost due to the finite time of the transition period. However, the energy loss is substantially lower than a non-ZVS circuit. ZVS allows for efficient operation of power inverters, especially at MHz frequency ranges. ZVS is achieved by using a combination of passive components such as capacitors and inductors with certain values.

The transmitter is configured to transfer power to a receiver of the wireless power transfer system via electric or magnetic field coupling. The transmitter may be configured to transfer power via other forms of wireless power transfer.

The auxiliary inverter may comprise a coupling element for inducing a voltage in the main inverter of the transmitter of the wireless power transfer system.

The auxiliary inverter may comprise an output network electrically connected to the coupling element.

The auxiliary inverter may comprise an adjustable power source electrically connected to the coupling element via the output network. An input voltage to the coupling element may be based on a detected signal.

The coupling element may be configured to induce the voltage in the main inverter of the transmitter of the wireless power transfer system to manage reflected impedance at the main inverter. The induced voltage may be based on the input voltage to the coupling element.

Managing the reflected impedance may comprise partially negating or reducing the reflected impedance in so much as these terms are meant to mean the same thing.

Managing the reflected impedance may comprise causing the main inverter to operate at a ZVS and/or at an optimal condition.

Reflected impedance may comprise reflected reactance and/or resistance.

Reflected reactance may be a result of changes or variations in the transmission medium through which wireless power is transferred. Reflected reactance may be a result of a foreign reactance.

The introduction of an auxiliary inverter may manage reflected reactance thereby providing a more robust main inverter. For example, the main inverter may operate in a greater variety of conditions, e.g. operate at optimal conditions through variations in the transmission medium.

The input voltage may be a direct current (DC) voltage.

The adjustable power source may be adjusted manually, for example by a user, and/or automatically, for example via one or more software or hardware components.

The adjustable power source may comprise an adjustable DC/DC converter.

The induced voltage may be based on at least one of an input voltage from the adjustable power, and a parameter of the output network.

The detected signal may be an output current of the main inverter or a switching waveform of the main inverter.

The auxiliary inverter may comprise a detector configured to monitor the signal. The auxiliary inverter may comprise a monitoring unit configured to monitor the signal in so far as the monitoring unit and detector are intended to mean the same thing.

The detector may comprise a current sense resistor or a current sense transformer configured to monitor an output current of the main inverter. Additionally or alternatively, the detector may comprise a divided voltage resistor which feeds into an analog circuit, e.g. comparator, or an analog/digital converter of a microcontroller configured to monitor a switching waveform of the main inverter.

The reflected impedance may comprise a reflected reactance. The reflected reactance may cause the main inverter to operate at a non-zero mode switching condition.

The coupling element may be configured to induce the induced voltage in an inductive coil or a capacitive electrode of the main inverter.

The induced voltage may be out of phase with a current at an output of the main inverter. The induced voltage may be at the main inverter. The induced voltage and the current may be (+/−) 90 degrees out of phase from each other.

The induced voltage may be positively or negatively out of phase with a voltage of the main inverter. The induced voltage may be at the main inverter. The induced voltage and the current may be (+/−) 90 degrees out of phase from each other.

The induced voltage may be proportional to a current at the output of the auxiliary inverter.

The coupling element may be configured to induce the induced voltage via capacitive or inductive coupling.

The output network may have the same circuit topology as the main inverter.

The auxiliary inverter may comprise a half-bridge or full-bridge inverter.

The auxiliary inverter may have a load-independent constant-current Class E configuration.

The auxiliary inverter may be driven by the same clock as the main inverter.

The auxiliary inverter may comprise a tuner for tuning the auxiliary inverter. The tuner may comprise a transistor, e.g. metal-oxide-semiconductor field-effect transistor (MOSFET). The transistor may have a non-linear output capacitance. The tuner may comprise one or more diodes connected in parallel to the transistor.

The auxiliary inverter may comprise a recording unit for recording the induced voltage and the detected signal. The recording unit may additionally or alternatively record at least one parameter of the main inverter.

In another aspect there is provided method of managing reactance at a main inverter of a transmitter of a wireless power transfer system.

The method may provide for a robust main inverter. In particular, the main inverter may be able to operate at optimal conditions even during variations in transmission medium.

The method may comprise inducing a voltage in the main inverter to at least partially negate effects of a reflected impedance at the main inverter.

The induced voltage may be based on an input voltage from an adjustable power source to a coupling element of an auxiliary inverter, the input voltage based on a detected signal.

The detected signal may be an output current of the main inverter or a switching waveform of the main inverter.

The method may comprise detecting the signal.

Detecting the signal may comprise detecting an output current of the main inverter or detecting a switching waveform of the main inverter.

The reflected impedance may cause the main inverter to operate at a non-zero mode switching condition.

The method may comprise tuning the auxiliary inverter. Tuning may comprise selecting a particular transistor, e.g. metal-oxide-semiconductor field-effect transistor (MOSFET). The transistor may have a non-linear output capacitance. Tuning may further comprise connecting one or more diodes in parallel with the transistor. The MOSFET may be selected with a particular non-linear output capacitance required to adjust the input voltage until a zero voltage switching (ZVS) condition or mode is achieved at the at least one of the auxiliary and main inverter.

Tuning may comprise adjusting the input voltage of the auxiliary inverter.

Adjusting the input voltage may comprise adjusting the input voltage until a ZVS condition or mode is achieved at the at least one of the auxiliary inverter and main inverter.

Adjusting the input voltage may comprise recording the induced voltage and the detected signal.

Adjusting the input voltage may comprise adjusting the input voltage based on at least one of the induced voltage and detected signal.

The method may comprise recording at least one parameter of the main inverter.

Adjusting the input voltage may comprise adjusting the input voltage based on the recorded parameter of the main inverter.

The described methods may provide one or more of the benefits described in respect of the auxiliary inverter and vice versa.

In another aspect there is provided a method of managing reflected impedance at a main inverter of a transmitter of a wireless power transfer system.

The method may provide for a robust main inverter. In particular the main inverter may be able to operate at optimal conditions even during variations in transmission medium.

The method may comprise detecting a signal of the main inverter of the transmitter of the wireless power transfer system.

The method may comprise adjusting a voltage induced in the main inverter of the transmitter of the wireless power transfer system based on the detected signal to at least partially negate effects of reflected impedance at the main inverter.

Adjusting the voltage induced may comprise adjusting a voltage induced by a coupling element configured to induce a voltage in the main inverter via electric or magnetic field coupling;

The coupling element may be electrically connected to a power source via an output network.

Adjusting the voltage induced by the coupling element may comprise at least one of: adjusting input voltage from the power source; and adjusting a parameter of the output network.

The signal may comprise output current of the main inverter or a switching waveform of the main inverter Detecting the signal may comprise continuously monitoring the main inverter of the transmitter of the wireless power transfer system.

In another aspect there is provided a non-transitory computer-readable medium comprising instructions that, when executed by one or more processors, perform any of the described methods.

The computer-readable medium may comprise storage media excluding propagating signals. The computer-readable medium may comprise any suitable memory or storage device such as random-access memory (RAM), static RAM (SRAM), dynamic RAM (DRAM), non-volatile RAM (NVRAM), read-only memory (ROM), or Flash memory.

The one or more processors may have a single-core processor or multiple core processors composed of a variety of materials, such as silicon, polysilicon, high-K dielectric, copper, and so on In another aspect there is provided a transmitter for a wireless power transfer system. The transmitter may comprise a power source, a transmit element configured to transfer power to a receive element of a receiver via magnetic or electric field coupling, and a main inverter electrically connected between the power source and transmit element. The main inverter may be configured to convert direct current (DC) to alternating current (AC). The transmitter may comprise at least one auxiliary inverter as described.

In another aspect there is provided a wireless power transfer system comprising at least one transmitter as described. The transmitter may further comprise a receiver comprising a load electrically connected to a receive element, the receive element for extracting power from a field generated by the transmit element via electric or magnetic field coupling.

The transmitter may transfer power via other means of wireless power transfer. The receiver may extract power via other means of wireless power transfer.

The described transmitter and wireless power transfer system may provide one or more of the benefits described in respect of the auxiliary inverter and methods, and vice versa.

BRIEF DESCRIPTION OF THE DRAWINGS

A description is now given, by way of example only, with reference to the accompanying drawings, in which.

DETAILED DESCRIPTION

Figure 1:
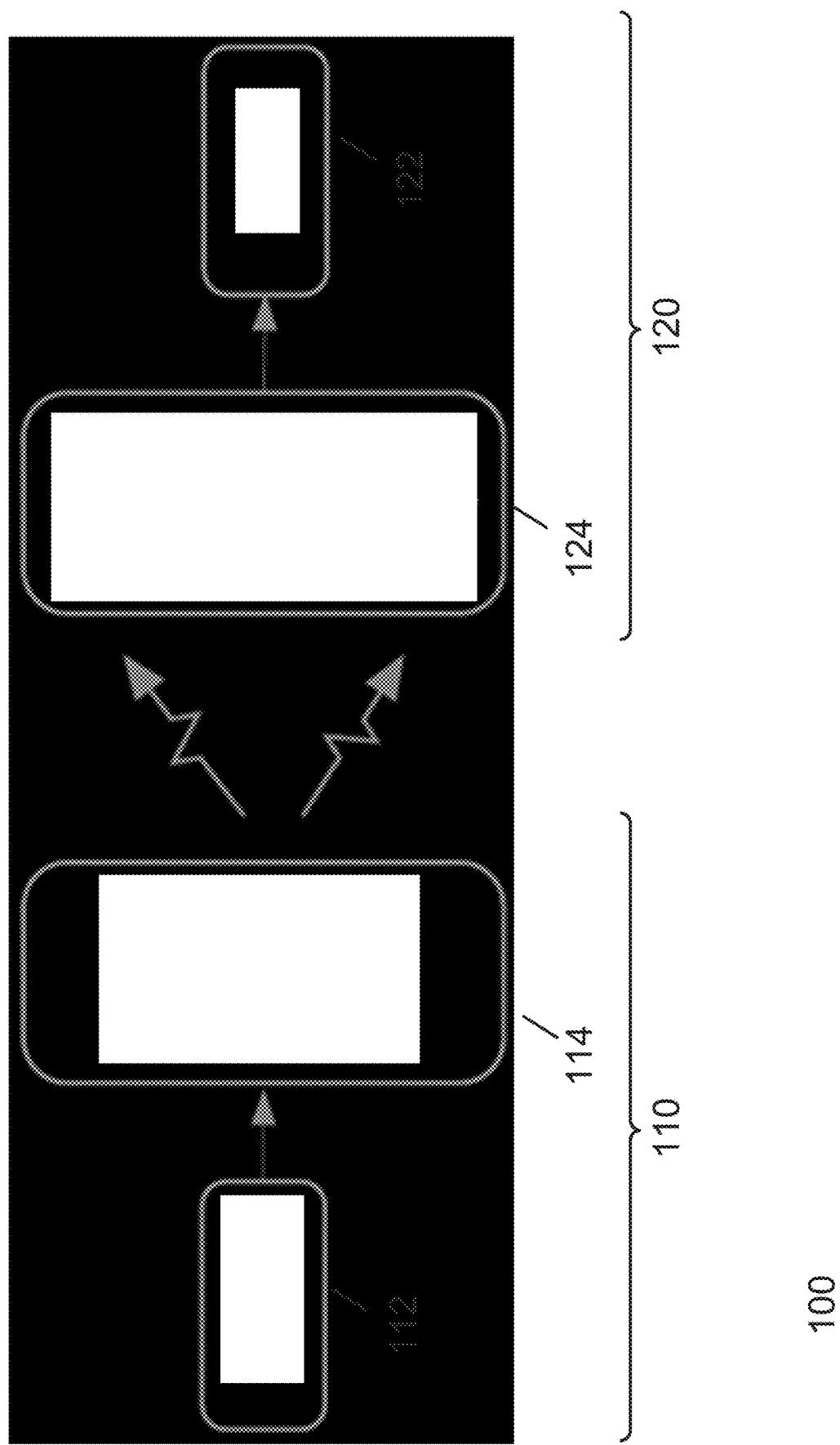
FIG. 1 is a block diagram of a wireless power transfer system.

The foregoing summary, as well as the following detailed description of certain examples will be better understood when read in conjunction with the appended drawings. As used herein, an element or feature introduced in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the described elements or features. Moreover, unless explicitly stated to the contrary, examples or embodiments "comprising" or "having" or "including" an element or feature or a plurality of elements or features having a particular property may include additional elements or features not having that property. Also, it will be appreciated that the terms "comprises", "has", "includes" means "including by not limited to" and the terms "comprising", "having" and "including" have equivalent meanings. It will also be appreciated that like reference characters will be used to refer to like elements throughout the description and drawings.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, and/or designed for the purpose of performing the function. It is also within the scope of the subject application that elements, components, and/or other subject matter that is described as being adapted to perform a particular function may additionally or alternatively be described as being configured to perform that function, and vice versa. Similarly, subject matter that is described as being configured to perform a particular function may additionally or alternatively be described as being operative to perform that function.

It will be understood that when an element is referred to as being "on," "attached" to, "connected" to, "coupled" with, "contacting," etc., another element, it can be directly on, attached to, connected to, coupled with or contacting the other element or intervening elements may also be present.

It should be understood that use of the word "exemplary", unless otherwise stated, means 'by way of example' or 'one example', rather than meaning a preferred or optimal design or implementation.

Unless defined otherwise, all technical and scientific terms used herein have the same meaning as is commonly understood by one of skill in the art to which the subject disclosure pertains.

Turning now to FIG. 1, a wireless power transfer system generally identified by reference numeral 100 is shown. The wireless power transfer system 100 comprises a transmitter 110 comprising a power source 112 electrically connected to a transmit element 114, and a receiver 120 comprising a receive element 124 electrically connected to a load 122. Power is transferred from the power source 112 to the transmit element 114. The power is then transferred from the transmit element 114 to the receive element 124 via resonant or non-resonant electric or magnetic field coupling. The power is then transferred from the receive element 124 to the load 122.

Figure 2:
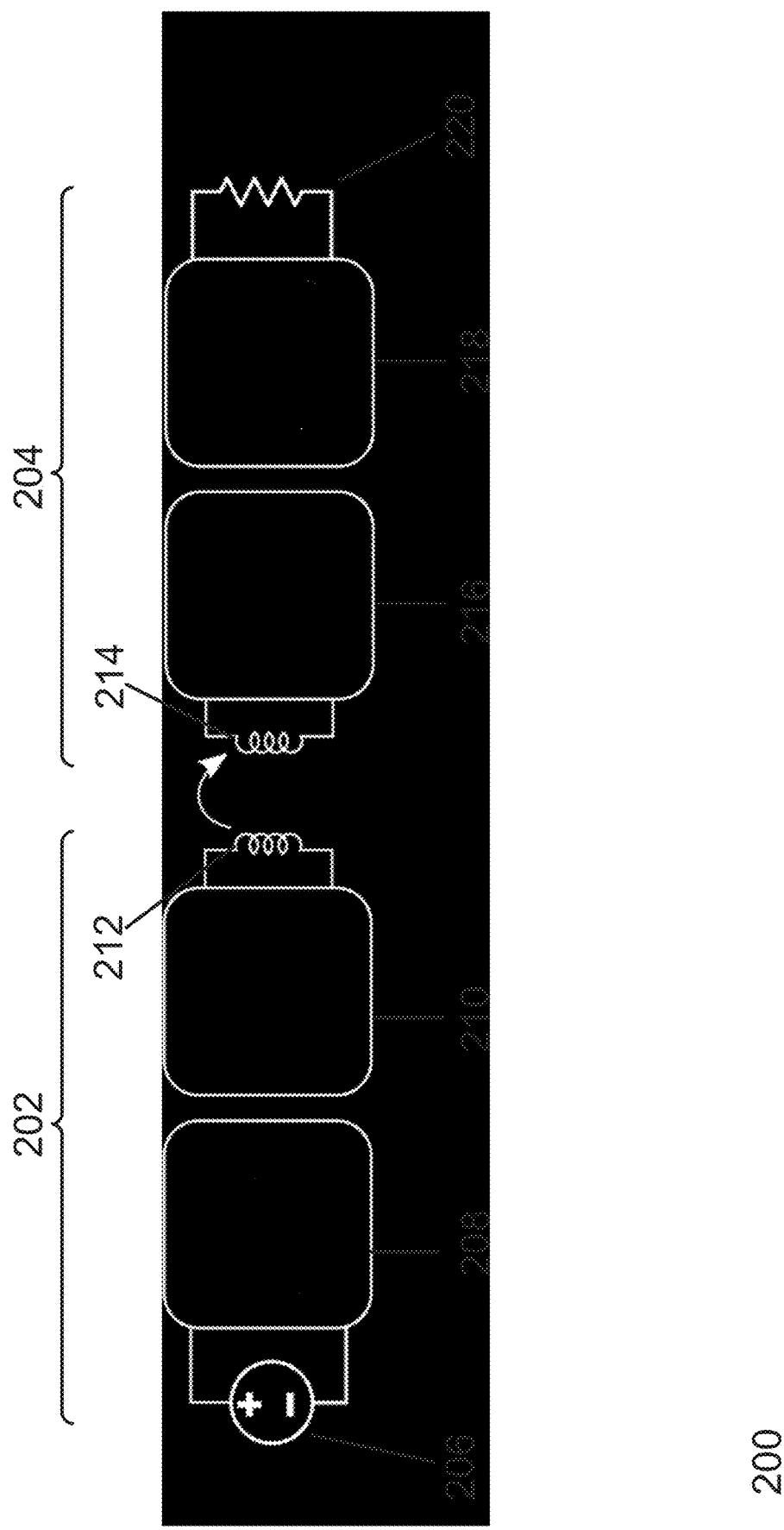
FIG. 2 is another block diagram of a wireless power transfer system.

Turning now to FIG. 2, a wireless power transfer system generally identified by reference numeral 200 is shown. The wireless power transfer system 200 comprises a transmitter 202 and a receiver 204. The wireless power transfer system 200 operates by transferring power from the transmitter 202 to a receiver 204. In this embodiment, the wireless power transfer system 200 transfers power via magnetic field coupling although one of skill in the art will appreciate that the wireless power transfer system 200 may transfer power via electric field coupling.

The transmitter 202 comprises a power source 206, a transmitter DC/DC converter 208, a DC/AC inverter or main inverter 210 and a transmit element 212. The power source 206 is electrically connected to the transmitter DC/DC converter 208. The power source 206 is configured to generate a DC power signal. The power source 206 is configured to output the DC power signal to the transmitter DC/DC converter 208. The transmitter DC/DC converter 208 is electrically connected to the power source 206 and the main inverter 210. The transmitter DC/DC converter 208 interfaces the power source 206 to the main inverter 210. The transmitter DC/DC converter 208 is configured to convert the DC power signal from the power source 206 to a voltage level for transmission to the main inverter 210.

One of skill in the art will appreciate the DC/DC converter 208 need not be present as part of the transmitter 202.

The main inverter 210 is electrically connected to the transmitter DC/DC converter 208 and the transmit element 212. The main inverter 210 is configured to convert the DC power signal from the transmitter DC/DC converter 208 into a sinusoidal radio frequency (RF) power signal, i.e. DC to AC. The sinusoidal RF power signal is output from the main inverter 210 to the transmitter coil 212. The main inverter 210 is tuned to operate at optimum switching conditions, i.e. zero voltage switching (ZVS). For the purposes of the subject disclosure, ZVS is switching of a transistor from an off state to an on state when the voltage across the transistor is zero. Consequently, there is no energy lost during this transition from the off to the on state. In practice, there is some energy lost due to the finite time of the transition period. However, the energy loss is substantially lower than a non-ZVS circuit. ZVS allows for efficient operation of power inverters, especially at MHz frequency ranges. ZVS is achieved by using a combination of passive components such as capacitors and inductors with certain values.

In this embodiment, the transmit element 212 comprises one or more inductive coils or inductors and power is transferred via magnetic field coupling, non-resonant or resonant. While an electric field may be present little to no power is transferred via electric field coupling, non-resonant or resonant. One of skill in the art will appreciate that the transmit element 212 may instead comprise one or capacitive electrodes and power is thus transferred via electric field coupling, non-resonant or resonant. In this embodiment while a magnetic field may be present little to no power is transferred via magnetic field coupling, non-resonant or resonant.

The receiver 204 comprises a receive element 214, an AC/DC rectifier 216, a receive DC/DC converter 218 and a load 220. The receive element 214 is electrically connected to the AC/DC rectifier 216. The receive element 214 is configured to receive power from the transmitter 202 via the transmit element 212. In this embodiment, the receive element 214 comprises one or more inductive coils or inductors and power is extracted via magnetic field coupling, non-resonant or resonant. As described with respect to the transmit element 202, while an electric field may be present little to no power is transferred via electric field coupling, non-resonant or resonant. In this embodiment, the receive element 214 has identical dimensions and number of turns as the transmit element 212.

Furthermore, one of skill in the art will appreciate that the receive element 212 may instead comprise one or capacitive electrodes and power is thus transferred via electric field coupling, non-resonant or resonant. In this embodiment while a magnetic field may be present little to no power is transferred via magnetic field coupling, non-resonant or resonant.

The AC/DC rectifier 216 is electrically connected to the receive element 214 and the receive DC/DC converter 218. The AC/DC rectifier 216 is configured to convert sinusoidal RF power signal from the receive element 214 to a DC power signal, i.e. AC to DC. The AC/DC rectifier 216 is configured to output the DC power signal to the receive DC/DC converter 218.

The receive DC/DC converter 218 is electrically connected to the AC/DC rectifier 216 and the load 220. The DC power signal is output from the AC/DC rectifier 216 to the receive DC/DC converter 218. The receive DC/DC converter 218 interfaces the AC/DC rectifier 216 to the load 220. The receive DC/DC converter 218 is configured to convert the received DC power signal. The converted DC power signal is output from the receive DC/DC converter 218 to the load 220. The load 220 is electrically connected to the receive DC/DC converter 218. The load 220 may be a fixed or a variable load.

While the receiver 204 has been described as comprising the receive DC/DC converter 218, one of skill in the art will appreciate that other configurations are possible. In another embodiment, the receiver 204 does not comprise the receive DC/DC converter 218. In this embodiment, the AC/DC rectifier 216 is electrically connected to the load 220. The AC/DC rectifier 216 is configured to generate a DC power signal that is acceptable to the load 220.

The receiver 204 operates at a given frequency. In this embodiment, the operating frequency of the receiver 204 is the operating frequency of the transmitter 202.

During operation of the wireless power transfer system 200, a power signal generated by the power source 206 that is electrically transferred via the transmitter DC/DC converter 208 and the main inverter 210 to the transmit element 212 causes the generation of a magnetic field. When the receiver 204, specifically the receive element 214, is placed within the magnetic field power is extracted from the magnetic field via resonant field coupling.

As previously stated, the main inverter 210 is configured to convert the DC power signal from the transmitter DC/DC converter 208 into a sinusoidal RF power signal. The sinusoidal RF power signal is output from main inverter 210 to the transmit element 212. In particular, the main inverter 210 drives the transmit element 212 with a sinusoidal alternating current (AC).

The main inverter 210 is affected by changes to loading conditions, changes in geometry of the wireless power transfer system 200 and external distances (i.e. environmental effects), such as the presence of metallic objects near the system 200. It is desirable therefore that the main inverter 210 is robust and tolerant to these changes and also that main inverter 210 operates in MHz frequencies.

In addition, the medium, i.e. the transmission medium, through which wireless power is transferred/extracted may vary. For example the medium may comprise multi-material constructed wall, concrete, wood, glass, or a wide range of other materials. Each time the medium changes the main inverter 210 of the wireless power transfer system 200 requires retuning in order to ensure operation of the inverter, and hence, the system 200, at optimum switching conditions, i.e. ZVS, and to maintain voltage/current regulation.

However, it can be complicated to achieve this optimum state because, simultaneously, changing components and/or retuning the main inverter 210 every time the medium through which power is transferred changes, is usually undesired, complicated, and inefficient.

Existing tuning methods such as mechanical variable capacitors and inductors require manual mechanical tuning, which is impractical in systems and/or products that contain wireless power transfer capabilities. Alternatively, known electronic tuning methods such as varactors, pin diodes and saturable reactors, have limited range, are inefficient, cannot be scaled up in relation to power increases, and do not lend themselves to efficient or practical manufacturability.

There are known solutions in which capacitors are switched in and out of the circuit. These solutions may work for some situations, however, switched capacitors offer discrete step changes, and therefore, a large number of capacitors are required to achieve the resolution and range required in wireless power transfer systems to effectively manage the reflected reactance. This is not efficient and also requires a large footprint, which is not ideal for many wireless power products and devices.

As described above, changes in transmission medium or other factors may require retuning of the wireless power transfer system 200 in order to operate at optimum switching conditions, i.e. ZVS. In particular, the reflected impedance seen by the wireless power transfer system 200 may change resulting in less than optimal switching conditions. For the purposes of the subject disclosure, impedance includes both resistance and reactance. Specifically, impedance may comprise the vector sum of resistance and reactance. While the wireless power system 200 may comprise circuits, for example in the main inverter 210, which are load-independent and therefore tolerant to variations in resistance, such circuits are not tolerant to changes in reactance, i.e. variations in reflected reactance.

Figure 3:
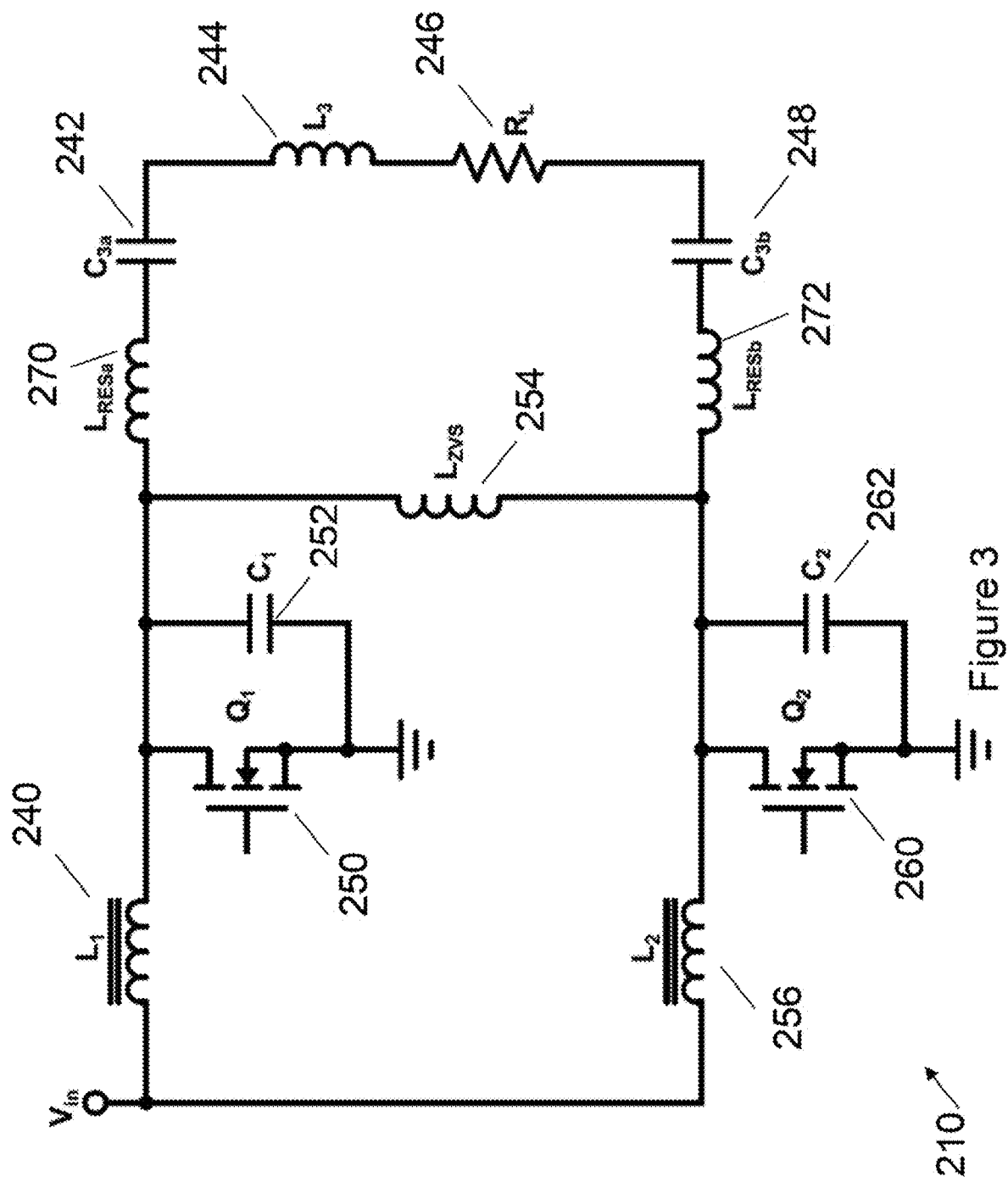
FIG. 3 is a circuit diagram of a main inverter of the wireless power transfer system of FIG. 2.

Turning now to FIG. 3, a circuit diagram of the main inverter 210 is depicted. In this embodiment, the main inverter 210 is configured to generate an AC output voltage with a constant amplitude regardless of load whilst maintaining ZVS. In this embodiment, the main inverter 210 is a push-pull inverter. In this embodiment, the main inverter 210 is a class E inverter. The main inverter 210 has a voltage-mode output. Voltage-mode output indicates that the main inverter 210 has a constant voltage output.

The main inverter 210 comprises a switched mode ZVS amplifier as will be described. The amplifier is a radio frequency (RF) amplifier.

As shown in FIG. 3, the switched mode ZVS amplifier comprises series inductors 240 and 256 with inductances L1 and L2, respectively, that receive an input voltage Vin. Each inductor 240, 256 is connected in series to a combination of a transistor 250 and 260 (Q1 and Q2), respectively, (or switch) and capacitor 252 and 262. The capacitors 252 and 262 have capacitances C1 and C2, respectively. Specifically, transistor 250 and capacitor 252 are arranged in parallel, and are connected to inductor 240. Transistor 260 and capacitor 262 are arranged in parallel and are connected to inductor 256. Both transistor 250, 260 and capacitor 252, 262 pairs are grounded. Inductor 254 with inductance LZVS is connected in parallel between the inductors 240 and 256. Inductor 270 with inductance LRESa, capacitor 242 with capacitance C3a, inductor 244 with inductance L3, resistor 246 with resistance RL, capacitor 248 with capacitance C3b, and inductor 272 with inductance LRESb are arranged in series and connected in parallel to inductor 254. Inductor 244 represents the inductance of the transmit element 212 and resistor 246 represents the reflected load of the receive element 214. Inductors 270, 272 represent the residual inductance of the receive element 214.

While a particular circuit diagram of the main inverter 210 has been described, one of skill in the art will appreciate that other configurations are possible.

Figure 4:
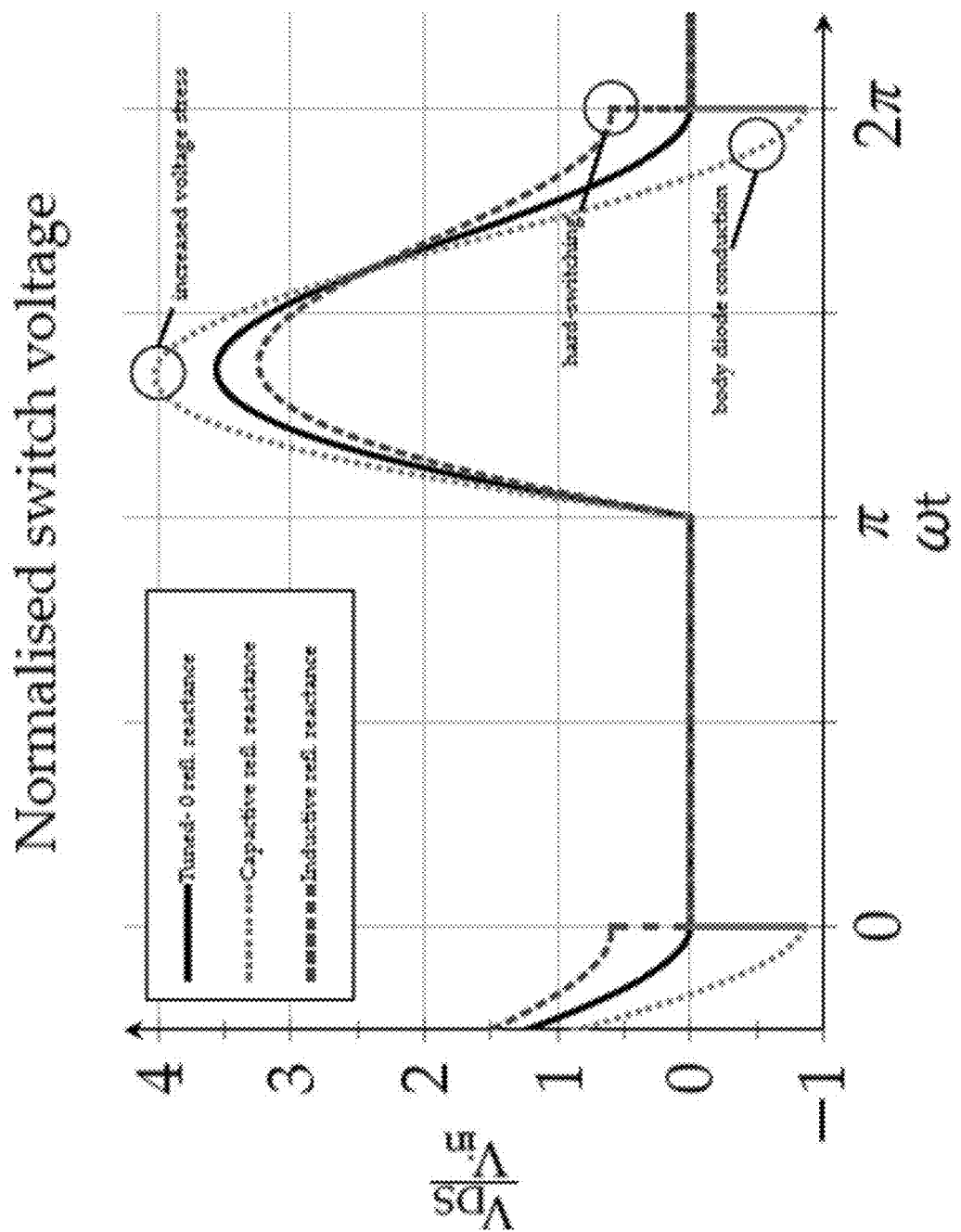
FIG. 4 is a graph of normalized switch voltage of the wireless power transfer system of FIG. 2 relative to switching frequency.

Turning now to FIG. 4, a graph of normalized switch voltages of the wireless power transfer system 200 relative to switching frequency is shown. FIG. 4 illustrates the effects of variations in the transmission medium. FIG. 4 is a graph of the ratio of voltage Vds between the drain and source of the transistors 250, 260 of the main inverter 210 and the input voltage Vin at the main inverter 210 relative to the switching frequency wt.

Upon introduction of a "foreign" impedance, specifically a reactance, to the main inverter 210, the main inverter 210 becomes detuned which directly affects its switching condition. A foreign reactance may be caused by the introduction of various materials between the transmitter 202 and the receiver 204. The foreign reactance is essentially the reflected reactance of the material introduced. The value of the reflected reactance will vary between different materials. For example, placing a pane of glass between the transmitter 202 and receiver 204 of the wireless power transfer system 200, would differ from placing wood and insulating materials between the transmitter 202 and receiver 204.

If the main inverter 210 is a load-independent constant-current inverter as disclosed in Applicant's U.S. Provisional Patent Application No. 62/899,165, the relevant portions of which are incorporated herein by reference, and illustrated in FIG. 3, a positive reactance will cause hard-switching to occur within the main inverter 210. Using the same load-independent constant-current inverter 210, a negative reactance will cause diode-conduction switching to occur.

Both hard-switching conditions and diode-conduction switching conditions are undesirable as they directly affect the output current regulation and increase the power losses in the main inverter 210.

The effect of reflected reactances on switching behaviour in a load-independent constant-current Class E inverter, as disclosed in above-incorporated U.S. Provisional Patent Application No. 62/899,165, is illustrated in FIG. 4. In the graph of FIG. 4, it can be seen that an inductive reflected reactance results in hard-switching of transistors (switches) 250, 260 in the main inverter 210, and a capacitive reflected reactance results in diode conduction switching of transistors (switches) 250, 260 of the main inverter 210.

The curves in FIG. 4 clearly illustrate that both the inductive reflected reactance and the capacitive reflected reactance cause the main inverter 210 to be out of tune with the previously in-tune main inverter 210, which experiences no reflected reactance. The inductive and capacitive reflected reactances equate to detuning of the main inverter 210 and thus cause the main inverter 210 to not operate at ZVS, as desired.

Figure 5:
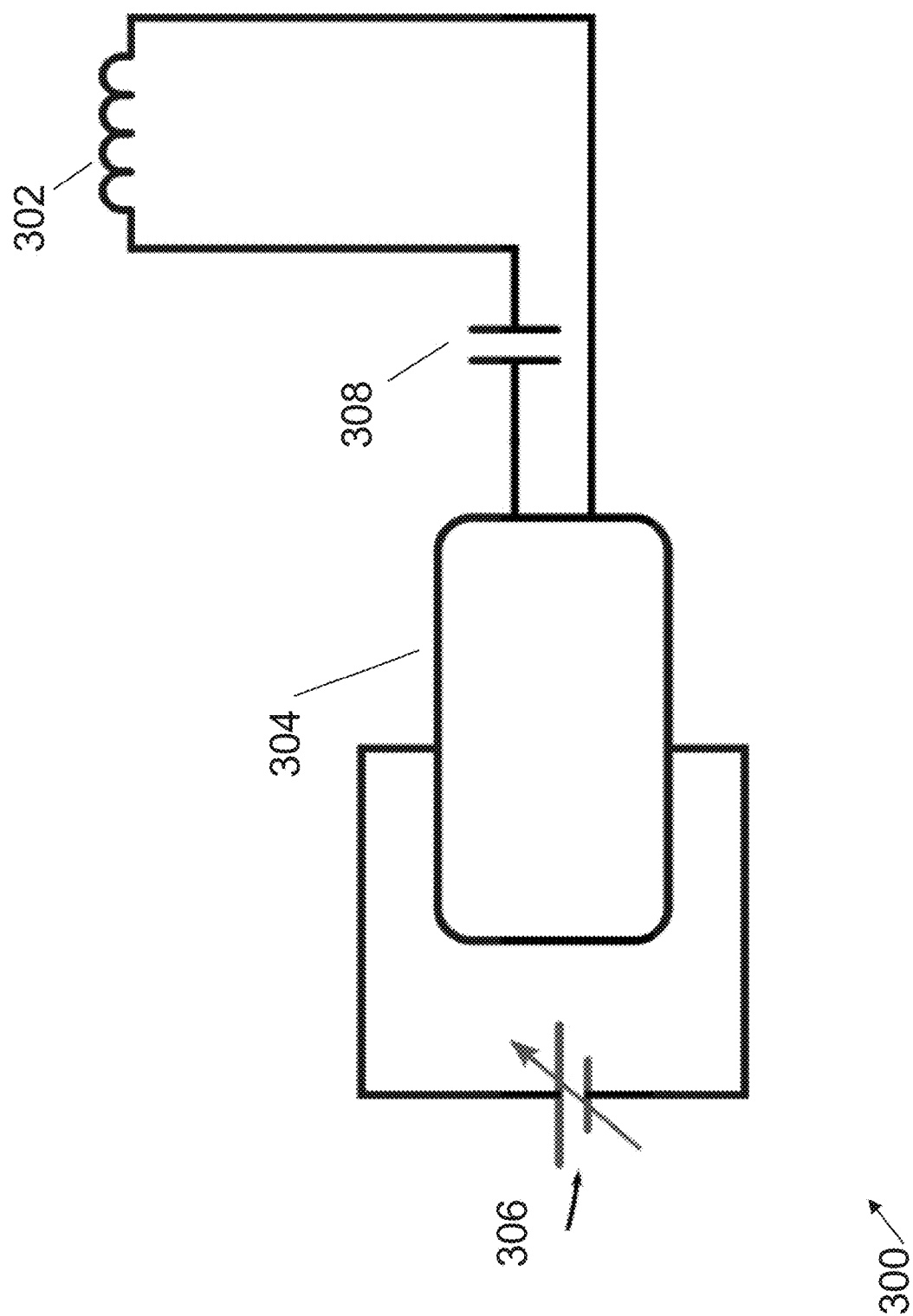
FIG. 5 is a block diagram of an auxiliary inverter in accordance with an aspect of the disclosure.

Turning now to FIG. 5, a block diagram of an auxiliary inverter 300 in accordance with an aspect of the disclosure is illustrated. The auxiliary inverter 300 is for use with a main inverter, e.g. the main inverter 210, of a transmitter of a wireless power transfer system. The auxiliary inverter 300 manages reflected impedance, specifically the reactance, at the main inverter 210. The auxiliary inverter 300 may partially negate the effects of the reflected reactance. As will be described the auxiliary inverter 300 induces a voltage in the main inverter 210 either by magnetic field (inductive) coupling or electric field (capacitive) coupling.

The auxiliary inverter 300 comprises a coupling element 302, an output network 304 and an adjustable power source 306. The coupling element 302 is electrically connected to the output network 304. The coupling element 302 induces a voltage in a corresponding coupling element of the main inverter 210. In this embodiment, the voltage is induced via magnetic field (inductive) coupling or electric field (capacitive) coupling although one of skill in the art will appreciate that other means of inducing a voltage may be possible. In this embodiment, the coupling element 302 comprises an inductive coil or inductor. Multiple inductive coils or inductors may be used. Thus, a voltage is induced via magnetic field (inductive) coupling. The coupling element 302 may alternatively or additionally comprise at least one capacitive electrode and a voltage will thus be induced via electric field (capacitive) coupling.

The adjustable power source 306 is electrically connected to the output network 304. The adjustable power source 306 is a DC power source. As will be described, the voltage output of adjustable power source 306 is adjusted to manage the reflected reactance of the main inverter 210. The voltage output of the adjustable power source 306 is adjusted based on a detected signal. In this embodiment the detected signal is detected by a detector (not shown).

The output network 304 is electrically connected to the adjustable power source 306 and the coupling element 302. The output network 304 may comprises a series of capacitors and inductors. Varying a parameter of the output network 304 may vary the induced voltage as will be described. The parameter of the output network 304 may be varied by adjusting capacitor or inductor values in the output network 304.

In this embodiment, the auxiliary inverter 300 further comprises capacitor 308. The capacitor 308 is electrically connected between the coupling element 302 and the output network 304. The capacitor 308 is configured to tune out the reactance of the inductances of the inverters 210, 300. One of skill in the art will appreciate that the capacitor 308 may be omitted.

Figure 6:
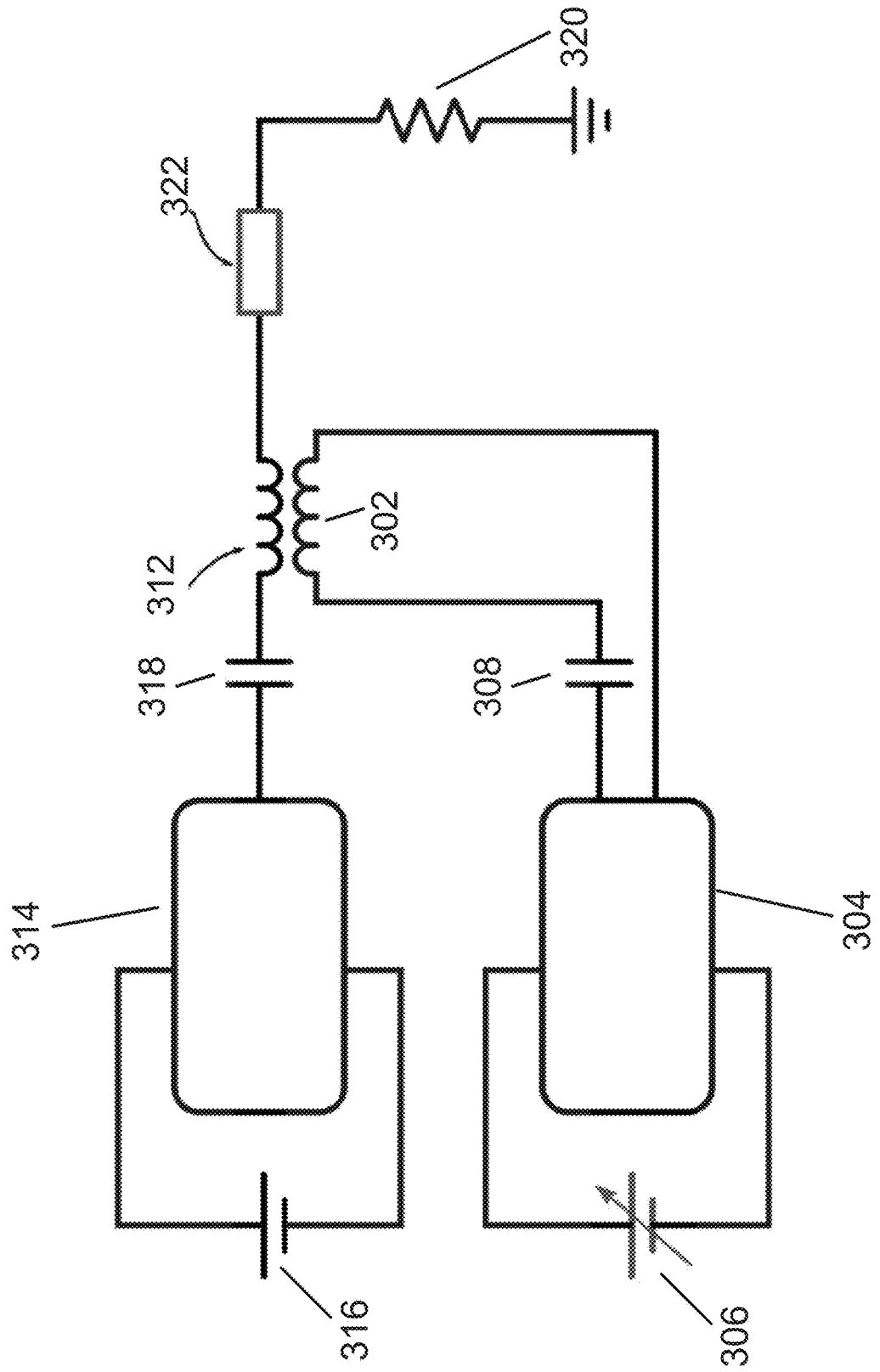
FIG. 6 is a block diagram of the auxiliary inverter of FIG. 5 and a main inverter of a transmitter of the wireless power transfer system of FIG. 2.

Turning now to FIG. 6, a block diagram of the auxiliary inverter 300 and an exemplary main inverter 210 is depicted. The main inverter 210 comprises a coupling element 312, an output network 314, a power source 316, a capacitor 318 and load 320. A voltage is induced by the coupling element 302 of the auxiliary inverter 300 into the coupling element 312 of the main inverter 210 to manage reflected impedance, specifically reactance, at the main inverter 210. The reflected reactance is at least partially negated. The negation of the reflected reactance may permit the main inverter 210 to operate at ZVS.

FIG. 6 further shows reactance element 322, which illustrates the effect of reflected impedance on the main inverter 210. The reactance element 322 may vary the reactance by −j20 to +j20, which causes the main inverter 210 to operate at a non-ZVS condition as previously-described. The reactance element is positioned between the load 320 and the coupling element 321 of the main inverter 210.

The coupling element 312 is electrically connected to the capacitor 318 and load 320. A voltage is induced in the coupling element 312 from the coupling element 302 of the auxiliary inverter 300 via magnetic field (inductive) coupling. Thus, in this embodiment the coupling element 312 comprises an inductive coil or inductor. Multiple inductive coils or inductors may be used. One of skill in the art will appreciate that the coupling 312 may instead comprise at least one capacitive electrode. In this embodiment, the auxiliary inverter 300 similarly comprises a coupling element 302 which comprises at least one capacitive electrode. A voltage is thus induced in the coupling element 312 from the coupling element 302 of the auxiliary inverter 300 via electric field (capacitive) field coupling.

The power source 316 is electrically connected to the output network 314 of the main inverter 210. The power source 316 is a DC power source.

The output network 314 is electrically connected to the power source 316 and the coupling element 312 of the main inverter 210. The output network 314 may comprise a series of capacitors and inductors. The voltage induced in the coupling element 312 is induced in the output network 314 to manage the reflected reactance at the main inverter 210.

The load 320 is electrically connected to the coupling element 312 of the main inverter 210 and ground.

In this embodiment, the auxiliary inverter 300 further comprises capacitor 318. The capacitor 318 is electrically connected between the coupling element 312 and the output network 314. The capacitor 318 is configured to tune out the reactance of the inductances of the inverters 210, 300. One of skill in the art will appreciate that the capacitor 318 may be omitted.

In operation, the voltage output of the adjustable power source 306 is adjusted based on a detected signal to vary the input voltage at the auxiliary inverter 300 thereby varying the voltage induced to the main inverter 210. Alternatively or in addition, a parameter of the output network 304 of the auxiliary inverter 300 is adjusted to vary the input voltage.

In this embodiment the detected signal is detected by a detector (not shown). The detector may continuously monitor the main inverter 210 for the detected signal. The detected signal comprises the output current of the main inverter 210 and/or the switching waveforms of the main inverter 210, e.g. the switching waveforms of the transistors (switches) 250, 260.

Measuring the output current may be performed using a current sense resistor or a current sense transformer as known in the art. Monitoring the switching waveforms may be performed via a divided voltage resistor, which feeds into either an analog circuit, e.g. a comparator, or into an analog/digital converter of a microcontroller.

Based on the detected signal, the output power of the adjustable power source 306 is adjusted and/or a parameter of the output network 304 of the auxiliary inverter 300 is adjusted to manage the reflected reactance at the main inverter 210.

The voltage induced in the output network 314 of the main inverter 210, by the auxiliary inverter 300, results in the negation of any reflected reactance that appear in the main inverter 210. As described with reference to FIG. 4, the reflected reactance may be capacitive or inductive. The induced voltage is either positive (+) 90-degrees or negative (−) 90-degrees out of phase from a current angle in the output network 314 of the main inverter 210. The magnitude of the induced voltage is proportional to the magnitude of the current in the output network 314. A positive (+) 90-degree induced voltage emulates a positive inductive reactance, and a negative (−) 90-degree induced voltage emulates a negative capacitive reactance.

Once a foreign reactance is reflected or appears in the output network 314, for example due to a variation in the transmission medium as previously described, the current in the output network 304 is controlled such that the induced voltage is equal and opposite to the voltage developed across the foreign reactance, thereby negating the foreign reactance completely. Thus, reflected reactance is managed and the main inverter 210 may operate at a ZVS condition.

There is no power exchange or consumption between the main inverter 210 and the auxiliary inverter 300 since the induced voltage and the current are (+/−) 90 degrees out of phase from each other. Therefore, the theoretical efficiency of the auxiliary inverter 300 is 100 percent. Furthermore, the auxiliary inverter 300 does not contribute any power to the load 320 of the main inverter 210. The main inverter 210 delivers all, or almost all, of the power to the load 320, at all times and under all conditions.

As previously stated, reflected reactance is managed and the main inverter 210 may operate at a ZVS condition. The managing of reflected reactance by negating or nulling the introduction of a foreign reactance is achieved by adjusting the input voltage to auxiliary inverter 300. Adjusting the input voltage controls a current flowing into the coupling element 302 of the auxiliary inverter 300. Adjusting the input voltage (DC) of the auxiliary inverter 300 may be done by manually adjusting the adjustable power supply 306, or through the use of hardware and/or software which automates the adjustment of the adjustable power supply 306. As previously stated, the input voltage may be additionally or alternatively adjusted by adjusting a parameter of the output network 304 of the auxiliary inverter 300.

Graphs of the normalized switch voltage of the main inverter 210 and auxiliary inverter 300 relative to switching frequency are shown in FIGS. 7a, 7b and 7c and illustrate the management of reflected reactance. During normal operation, both inverters 210, 300 operate at ZVS, i.e. both inverters 210, 300 are tuned, as shown in FIG. 7a. FIG. 7a shows the main inverter 210 and auxiliary inverter 300 tuned and operating under normal conditions.

When a foreign reactance is introduced, for example due to a change in the transmission medium, the reflected reactance at the main inverter 300 causes the main inverter 300 to become detuned and operate at a non-ZVS condition as shown in FIG. 7b.

The foreign reactance presents as an increase in inductive reactance to the main inverter 210. The inductive reactance detunes the main inverter 210 and results in a hard-switching condition as shown in FIG. 4. To correct the hard-switching condition in the main inverter 210, the input voltage to the auxiliary inverter 300 is adjusted such that the induced voltage results in a negative capacitive reactance that is equal to the positive inductive reactance seen by the main inverter 210. Consequently, the main inverter 210 is retuned, the hard-switching condition is removed, and the main inverter 210 is retuned to operation at the optimum switching condition, with close to or exactly zero reflected reactance as shown in FIG. 7c.

As previously stated, when the reflected reactance is managed, e.g. negated or nulled, the main inverter 210 operates at ZVS with the "foreign" reactance as it is now tuned. However, there is now potentially a problem with tuning in the auxiliary inverter 300. The auxiliary inverter 300 tunes the main inverter 210 such that the main inverter may operate at ZVS. However, the auxiliary inverter 300 now becomes detuned since the input voltage of the auxiliary inverter 300 has been adjusted and disturbed during the management of the reflected reactance, i.e. the initial tuning of the main inverter 210. Consequently, the auxiliary inverter 300 now operates at a hard-switching condition which results in additional power loss and heat generation. The hard-switching condition is illustrated in FIG. 7c The auxiliary inverter 300 may be untuned if desired. The auxiliary inverter 300 may be a low power circuit and as such this untuned state may not be significant. However, the auxiliary inverter 300 may be retuned to operate at a ZVS condition as will be described.

The auxiliary inverter 300 may require calibration in order to induce the appropriate voltage into the main inverter 210 for a particular reflected reactance. As such a calibration process of the auxiliary inverter 300 may be employed. The calibration process involves introducing known reactance to the main inverter 210, therefore detuning the main inverter 210 by a known reactance value. By adjusting the input voltage to the auxiliary inverter 300, until ZVS is achieved for both the main inverter 210 and the auxiliary inverter 300, the required input voltage may be determined. For every reactance value introduced, the switching voltage waveforms of the main inverter 210 and auxiliary inverter 300 are recorded. Parameters, such as peak voltage and the hard-switching voltage, are also identified. The recorded waveforms and parameters are stored in a lookup table, which matches the input voltage required to be applied to the auxiliary inverter 300 when the main inverter 210 is detuned by a given reactance. This lookup table may be programmed into a microprocessor or an analog circuit in the form of comparators, which then control the DC voltage applied to the auxiliary inverter 300, i.e. control the adjustable power source 306 of the auxiliary inverter 300.

Figure 8:
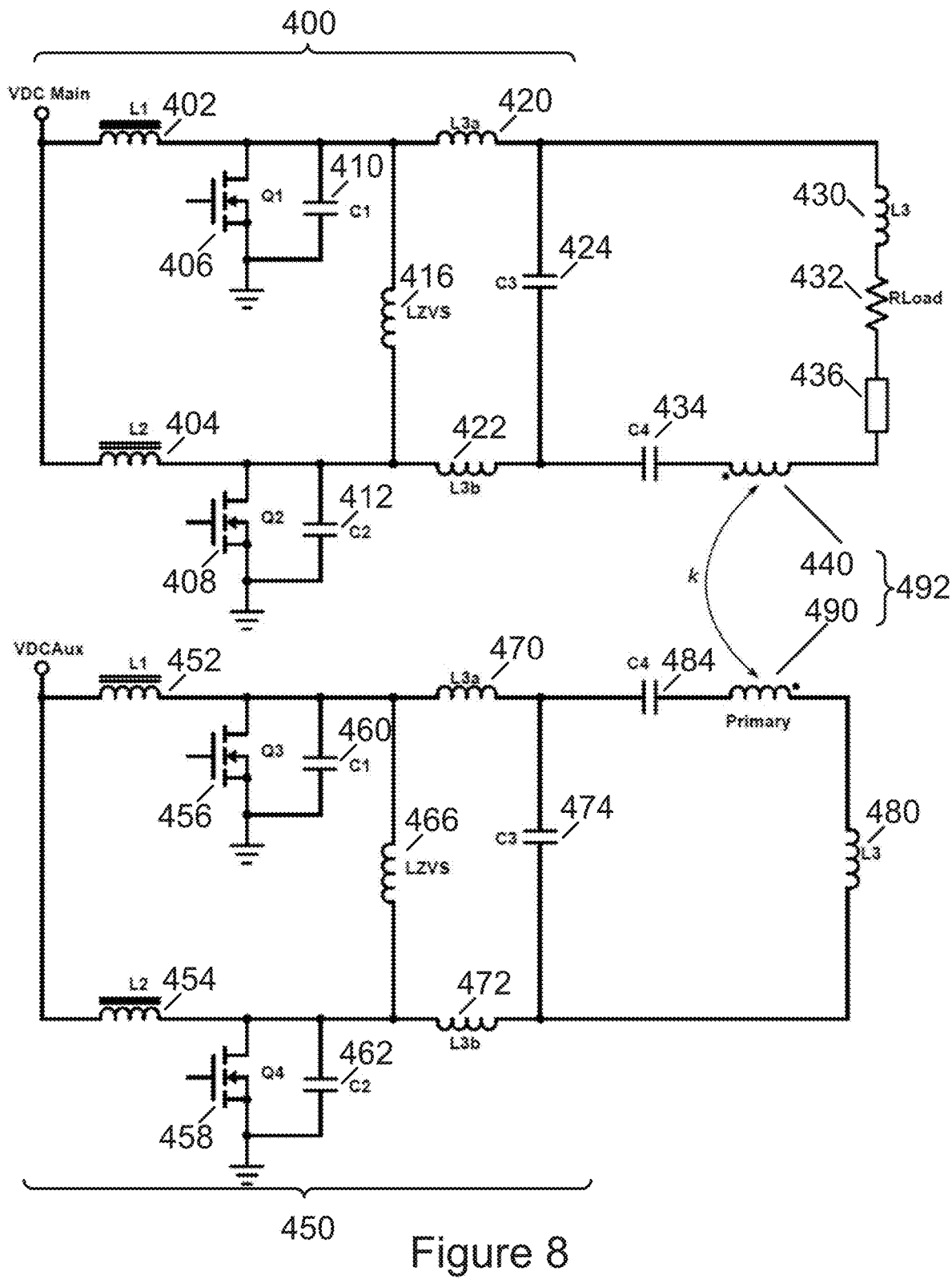
FIG. 8 is a circuit diagram of an embodiment of an auxiliary inverter in accordance with an aspect of the disclosure and a main inverter of a transmitter of a wireless power transfer system.
Figure 9:
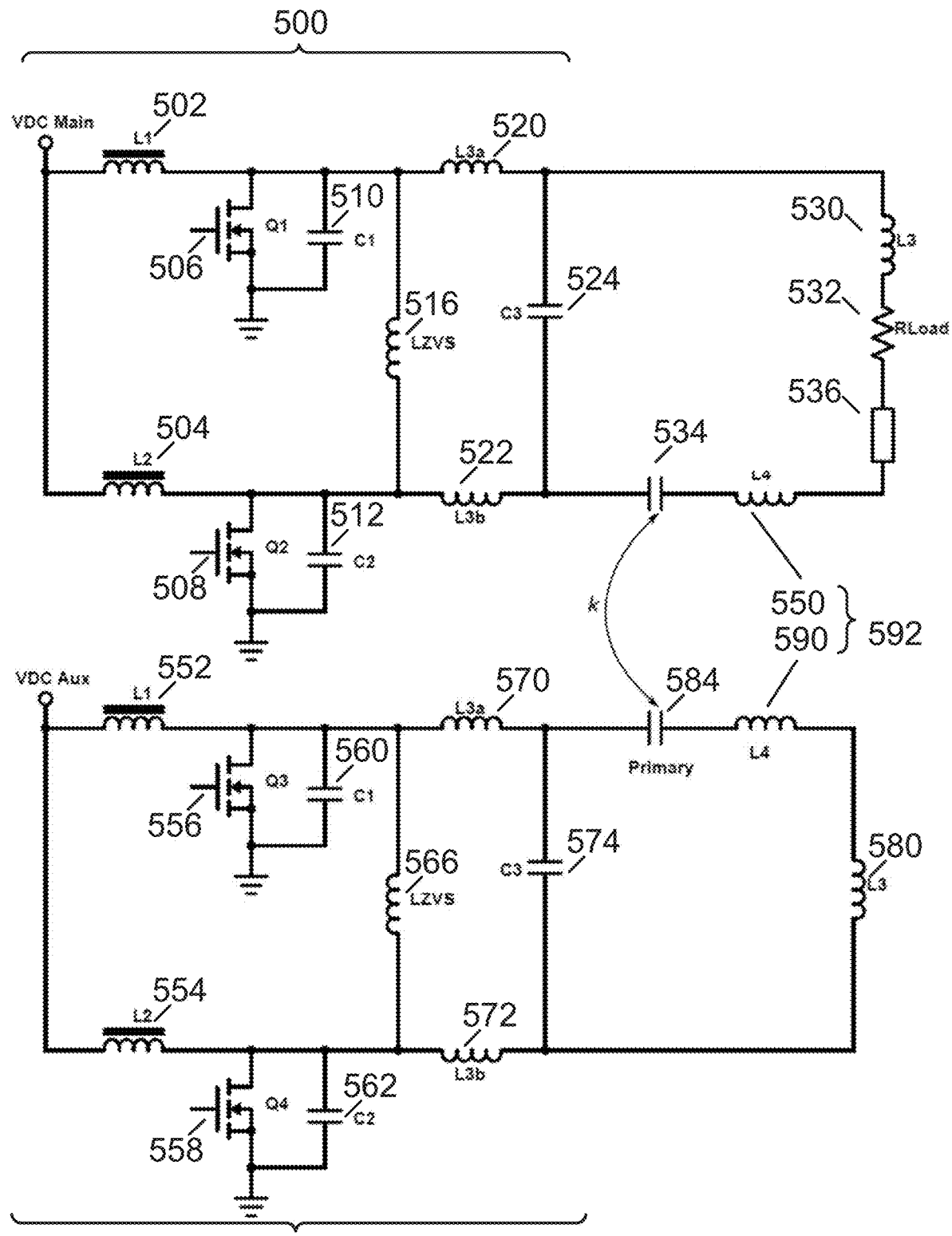
FIG. 9 is a circuit diagram of an embodiment of another auxiliary inverter in accordance with an aspect of the disclosure and a main inverter of a transmitter of a wireless power transfer system.

While block diagrams of the inverters 210, 300 have been described, particular exemplary implementations are further presented below. Turning now to FIGS. 8 and 9, exemplary circuit diagrams of the main inverter 210 and auxiliary inverter 300 are depicted. In FIG. 8 voltage is induced via magnetic field (inductive) coupling while in FIG. 9 voltage is induced via electric field (capacitive) coupling.

As shown in FIG. 8, in this embodiment the main inverter 210 comprises an output network 400 electrically connected to a coupling element 440. Coupling element 440 is identical to coupling element 312 unless otherwise stated. The output network 400 comprises series inductors 402 and 404 with inductances L1 and L2, respectively, that receive an input voltage VDC Main. Each inductor 402, 404 is connected in series to a combination of a transistor 406, 408 (Q1 and Q2), respectively, (or switch) and capacitor 410, 412, respectively. The capacitors 410, 412 have capacitances C1 and C2, respectively. Specifically, transistor 406 and capacitor 410 are arranged in parallel, and are connected to inductor 402. Transistor 408 and capacitor 412 are arranged in parallel and are connected to inductor 404. Both transistor 406, 408 and capacitor 410, 412 pairs are grounded. Inductor 416 with inductance LZVS is connected in parallel between the inductors 402, 404. Inductor 420 with inductance L1a and inductor 422 with inductance L3b are arranged in series to inductor 416 and connected in parallel to capacitor 424 with capacitance C3. Coupling element 440 is arranged in series with inductors 420, 422 and in parallel with capacitor 424. Inductor 430 with inductance L3, resistor 432 with resistance RLoad and capacitor 434 with capacitance C4 are arranged in series with coupling element 440. Capacitor 434 is identical to capacitor 318 unless otherwise stated. Inductor 430 represents the inductance of the transmit element of the transmitter associated with the main inverter 210. Resistor 432 represents the reflected load of the receive element of the receiver to which the transmitter associated with the main inverter 210 is transferring power. The circuit diagram further includes reactance element 436 which represents the reflected reactance.

The coupling element 440 of the main inverter 210 is the main winding of the main inverter 210.

The auxiliary inverter 300 comprises an output network 450 electrically connected to a coupling element 490. Coupling element 490 is identical to coupling element 302 unless otherwise stated. The output network 450 comprises series inductors 452 and 454 with inductances L1 and L2, respectively, that receive an input voltage VDC Aux. Each inductor 452, 454 is connected in series to a combination of a transistor 456, 458 (Q1 and Q2), respectively, (or switch) and capacitor 460, 462, respectively. The capacitors 460, 462 have capacitances C1 and C2, respectively. Specifically, transistor 456 and capacitor 460 are arranged in parallel, and are connected to inductor 452. Transistor 458 and capacitor 462 are arranged in parallel and are connected to inductor 454. Both transistor 456, 458 and capacitor 460, 462 pairs are grounded. Inductor 466 with inductance LZVS is connected in parallel between the inductors 452, 454. Inductor 470 with inductance L1a and inductor 472 with inductance L3b are arranged in series to inductor 466 and connected in parallel to capacitor 474 with capacitance C3. Coupling element 490 is arranged in series with inductors 470, 472 and in parallel with capacitor 474. Inductor 480 with inductance L3 and capacitor 484 with capacitance C4 are arranged in series with coupling element 490. Capacitor 484 is identical to capacitor 308 unless otherwise stated. Inductor 480 represents the inductance of the auxiliary inverter 300.

The coupling element 490 of the auxiliary inverter 300 is the auxiliary winding of the auxiliary inverter 300. Thus, the main winding of the main inverter 210 is coupled to the output network 450 of the auxiliary inverter 300, and the auxiliary winding of the auxiliary inverter 300 is coupled to the output network 400 of the main inverter 210. The coupling elements 440, 490 form an inductive transformer 492 which inductively couples the main inverter 210 with the auxiliary inverter 300.

The coupling coefficient between coupling elements 440 and 490 is represented by k. The coupling coefficient k between the main inverter 210 and auxiliary inverter 300 can be of any value between 0 and 1. A k value of 0.5 is assumed for simplicity throughout this disclosure.

Turning now to FIG. 9, a circuit diagram of the main inverter 210 and auxiliary inverter 300 is depicted with induced electric field (capacitive) coupling. As shown in FIG. 9, in this embodiment the main inverter 210 comprises an output network 500 electrically connected to a coupling element 540. In this embodiment, the coupling element 540 comprises one or more capacitive electrodes. Each capacitive electrode may take the form of an elongate plate. The elements of the output network 500 are the same as the elements of the output network 400 with like elements having reference numerals increased by 100.

The auxiliary inverter 300 comprises an output network 550 electrically connected to a coupling element 590. In this embodiment, the coupling element 490 comprises one or more capacitive electrodes. Each capacitive electrode may take the form of an elongate plate. The elements of the output network 550 are the same as the elements of the output network 450 with like elements having reference numerals increased by 100.

In the embodiment depicted in FIG. 9, voltage is induced in the main inverter 210 via electric field (capacitive) field coupling. The coupling elements 550, 590 form a capacitive transformer 590. The induced voltage from the auxiliary inverter 300 is delivered to the main inverter 210 via electric field (capacitive) coupling of the capacitive electrodes of the capacitive transformer 592. The coupling coefficient is represented by k.

In electric field (capacitive coupling), a capacitive transformer is used, based on Applicant's U.S. Pat. No. 9,653,948, the relevant portions of which are incorporated herein by reference, to capacitively couple the main inverter 210 with the auxiliary inverter 300. Similar, to FIG. 8, the coupling element 590 of the auxiliary inverter 300 is the auxiliary winding of the auxiliary inverter 300. Thus, the main winding of the main inverter 210 is coupled to the output network 550 of the auxiliary inverter 300, and the auxiliary winding of the auxiliary inverter is coupled to the output network 500 of the main inverter 210. The coupling elements 540, 590 form an inductive transformer 592, which inductively couples the main inverter 210 with the auxiliary inverter 300.

The coupling coefficient between coupling elements 540, 590 is represented by k. The coupling coefficient k between the main inverter 210 and auxiliary inverter 300 can be of any value between 0 and 1. A k value of 0.5 is assumed for simplicity throughout this document. As shown in FIG. 9, additional inductors 530, 580, each having an inductance L3, are used to tune out the reactance of the inverters 210, 300.

While the circuit topologies of the inverters 210, 300 depicted in FIGS. 8 and 9 are similar or identical, one of skill in the art will appreciate that the circuit topologies between the main inverter 210 and auxiliary inverter 300 may be different. However, similar or identical topologies allow the inverters 210, 300 to be synchronized more easily.

The inverters 210, 300 depicted in FIGS. 8 and 9 are driven by the same clock allowing for easier synchronization. One of skill in the art will appreciate that each inverter 210, 300 may have a distinct and separate clock.

In one or more embodiments, the main inverter 210 comprises a half-bridge or full-bridge zero voltage switching inverter. In one or more embodiments, the auxiliary inverter 300 comprises a load-independent constant-current Class E configuration. In this embodiment, the auxiliary inverter 300 comprises a load-independent constant-current Class E configuration.

As previously described, following tuning of the main inverter 210 or management of the reflected reactance, the auxiliary inverter 300 may be retuned to operate at a ZVS condition. To retune the auxiliary inverter 300, the capacitance of the transistors (switches) 456, 458, 556, 558 may be reduced. Use of MOSFET as each of the transistors 456, 458, 556, 558 allows the non-linearity of a MOSFET to be taken into account when reducing the capacitance.

Figure 10:
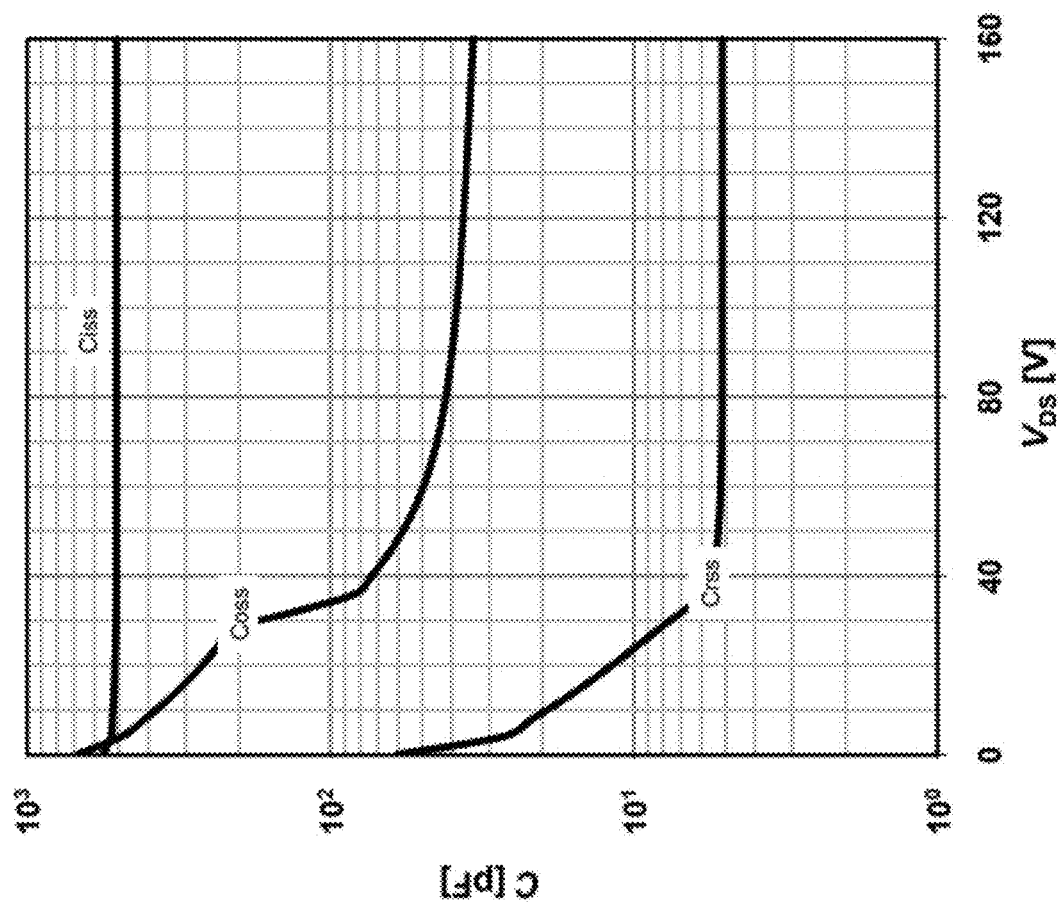
FIG. 10 illustrates capacitance curves of a metal-oxide-semiconductor field-effect transistor (MOSFET) relative to DC voltage.

Typical capacitance curves of a MOSFET are illustrated in FIG. 10. The capacitance curve Coss represents the output capacitance of a MOSFET relative to the DC voltage. As shown in FIG. 10, the MOSFET's output capacitance decreases with increasing input DC voltage. The capacitance curve Ciss represents the input capacitance of the MOSFET relative to DC voltage. The capacitance curve Crss represents the reverse transfer capacitance of the MOSFET relative to DC voltage. The capacitance curves depicted in FIG. 10 were obtained from a manufacture's datasheet of a typical MOSFET. In this example, the MOSFET is an Infineon BSZ12DN20NS3 model. One of skill in the art will recognize that any MOSFET type or brand may be used.

In the case of any standalone single inverter, e.g. main inverter 210, at low input DC voltages, the main inverter 210 operates at hard-switching condition, and as the input DC voltage is increased, the main inverter 210 trends towards operating at ZVS. Therefore, as the input DC voltage to the auxiliary inverter 300 is increased, the consequence is the MOSFET's output capacitance will decrease, which directly impacts the switching waveform of the main inverter 210 by reducing hard-switching.

As previously stated, while the main inverter 210 is retuned, i.e. negating reflected reactance, the auxiliary inverter 300 is detuned and operates at a hard-switching state. It is known in the art that to reduce hard-switching, the value of the capacitor connected in parallel with the MOSFET can be reduced. The amount of hard-switching that is present is related to the amount of capacitance which must be reduced. For example, if there is 5V of hard-switching present, the capacitance may need to be reduced by 50 pF. This reduction value is dependent on the design configuration of the inverter. For example, the capacitance reduction may be 50 pF for one design, however, may require a reduction of 100 pF for another inverter design configuration.

Therefore, the relationship between the hard-switching voltage and the value of capacitance required to reduce the voltage for the specific design needs to be determined. The reduced capacitance may be determined by directly calculating the value or relying on simulation models. Once the hard-switching voltage and capacitance value relationship has been determined, MOSFETs that meet the requirements of the value can then be determined and introduced. In the case where a specific MOSFET cannot be found, more than one MOSFET or diode can be used to create the required reduction in capacitance value. Both MOSFETs and diodes have output capacitances that are dependent on their applied voltage. In particular the output capacitance Coss of the transistors, e.g. MOSFETs, of the auxiliary inverter 300 may be altered by adding diodes in parallel with the MOSFET to retune the auxiliary inverter 300.

Figure 11:
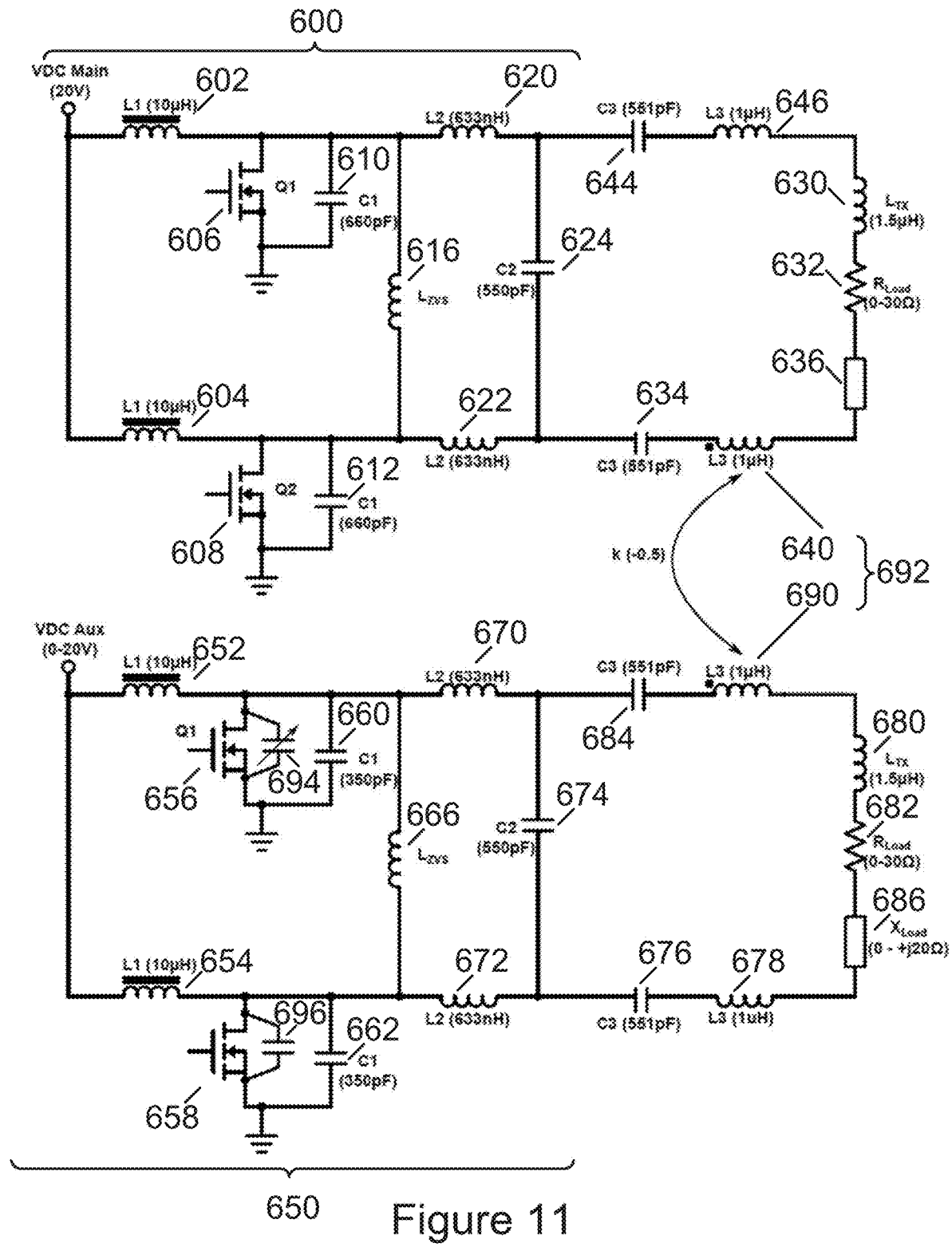
FIG. 11 is a circuit diagram of an embodiment of another auxiliary inverter in accordance with an aspect of the disclosure and a main inverter of a transmitter of a wireless power transfer system.

Turning now to FIG. 11, an exemplary circuit diagram of the inverters 210, 300 is illustrated. As will be described, the diodes retune the auxiliary inverter 300 after the main inverter 210 has been returned such that both inverters 210, 300 operate at ZVS conditions.

Figure 7:
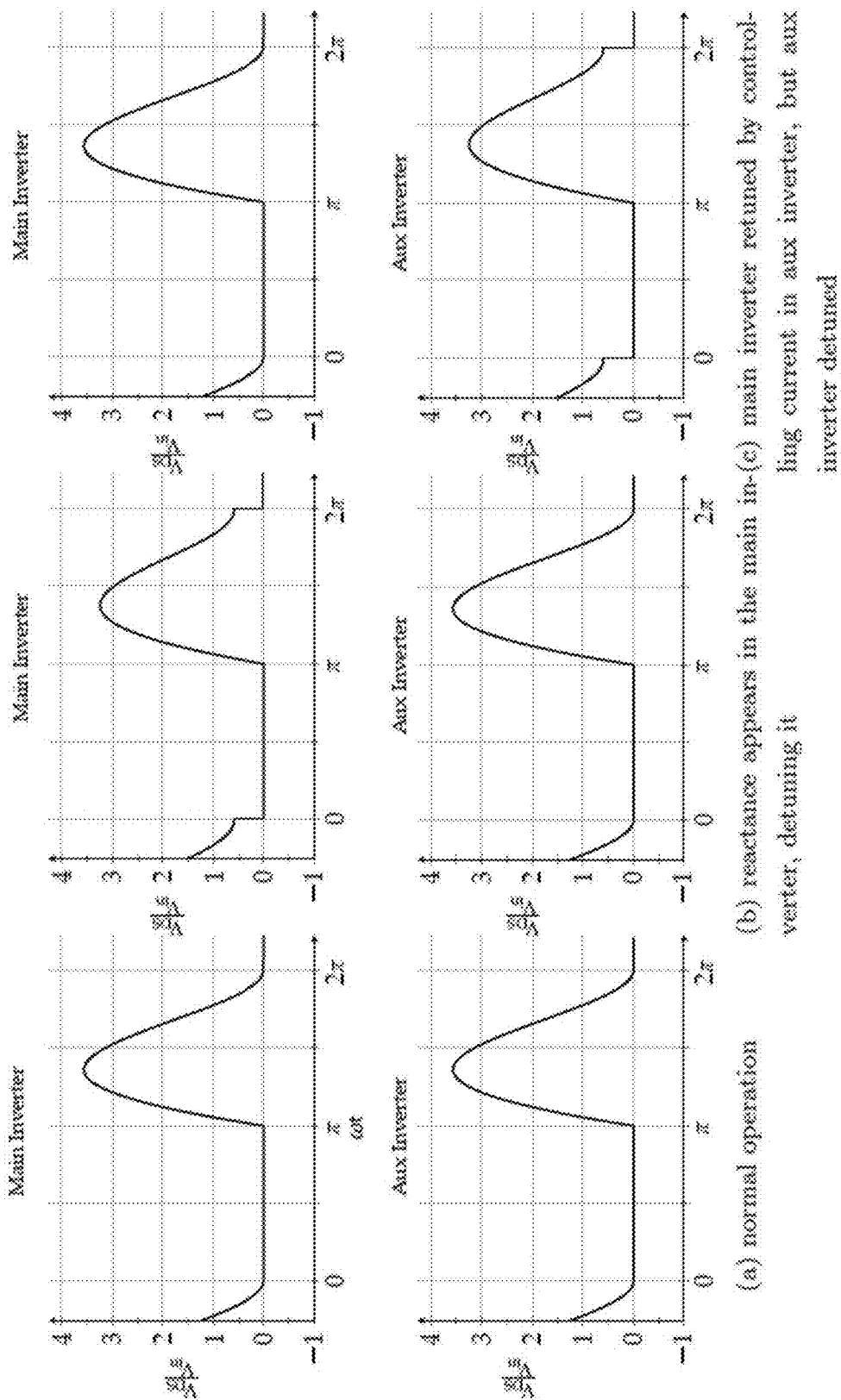
FIG. 7a illustrates graphs of normalized switch voltage of the main and auxiliary inverters of FIG. 6 relative to switching frequency during normal operation.
FIG. 7b illustrates graphs of normalized switch voltage of the main and auxiliary inverters of FIG. 6 relative to switching frequency with a detuned main inverter.
FIG. 7c illustrates graphs of normalized switch voltage of the main and auxiliary inverters of FIG. 6 relative to switching frequency with a detuned auxiliary inverter.

The main inverter 210 is identical to the previously-described main inverter 210 depicted in FIG. 7 with like elements having reference numerals incremented by 200 unless otherwise stated. In this embodiment, the output network 600 of the main inverter 210 comprises inductors 620, 622 which each have an inductance L2. In addition, the capacitor 525 has a capacitance C2, the capacitor 634 has a capacitance C3 and the inductor 630 has an inductance LTX. The output network 600 additionally comprises capacitor 644 with a capacitance C3 and inductor 646 with an inductance L3.

Similarly, the auxiliary inverter 300 is identical to the previously-described auxiliary inverter 300 depicted in FIG. 7 with like elements having reference numerals incremented by 200 unless otherwise stated. In this embodiment, the output network 650 of the auxiliary inverter 300 comprises inductors 670, 672 which each have an inductance L2. In addition, the capacitor 674 has a capacitance C2, the capacitor 684 has a capacitance C3 and the inductor 680 has an inductance LTX. The output network 650 additionally comprises capacitor 676 with capacitance C3, inductor 678 with inductance L3, resistor 682 with load RLoad and reactive element 686 with reactance Xload.

The output network 650 of the auxiliary inverter 300 additionally comprises a variable capacitor 694 connected in parallel to the transistor (switch) 656 and a variable capacitor 696 arranged in parallel with the transistor (switch) 658. Each capacitor 694, 696 represents the non-linear output capacitance Coss of the respective transistor (switch) 656, 658, which in this embodiment is a MOSFET.

Figure 12:
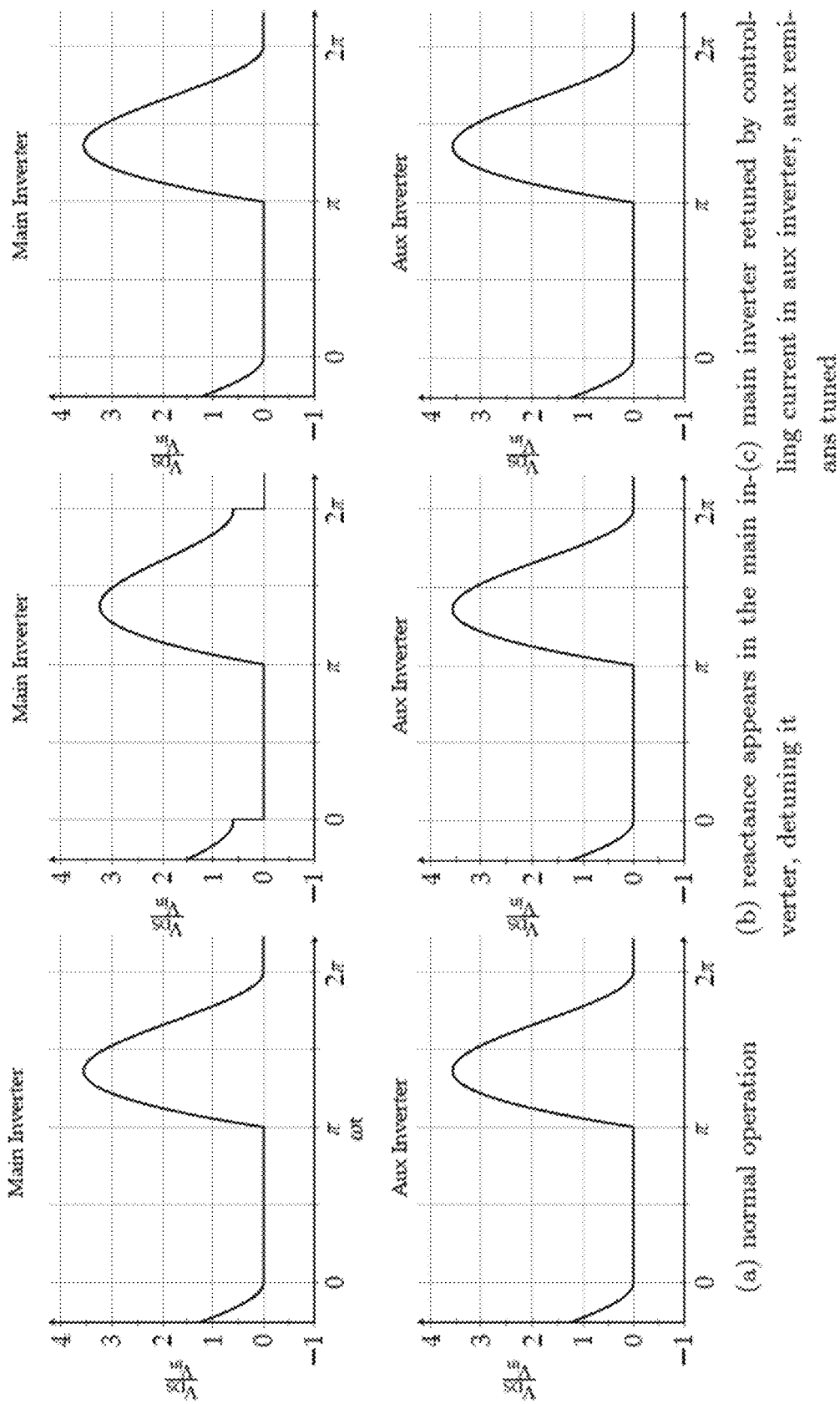
FIG. 12a illustrates graphs of normalized switch voltage of the main and auxiliary inverters of FIG. 11 relative to switching frequency during normal operation.
FIG. 12b illustrates graphs of normalized switch voltage of the main and auxiliary inverters of FIG. 11 relative to switching frequency with a detuned main inverter.
FIG. 12c illustrates graphs of normalized switch voltage of the main and auxiliary inverters of FIG. 11 relative to switching frequency with a detuned auxiliary inverter.

Graphs of the normalized switch voltage of the main inverter 210 and auxiliary inverter 300 relative to switching frequency are shown in FIGS. 12a, 12b and 12c and illustrate the effect of this retuning of the auxiliary inverter. During normal operation, both inverters 210, 300 operate at ZVS, i.e. both inverters 210, 300 are tuned, as shown in FIG. 12a. FIG. 12a shows the main inverter 210 and auxiliary inverter 300 tuned and operating under normal conditions.

When a foreign reactance is introduced, for example due to a change in the transmission medium, the reflected reactance at the main inverter 210 causes the main inverter 210 to become detuned and operate at a non-ZVS condition as shown in FIG. 12b.

The foreign reactance presents as an increase in inductive reactance to the main inverter 210. The inductive reactance detunes the main inverter 210 and results in a hard-switching condition as shown in FIG. 4. To correct the hard-switching condition in the main inverter 210, the input voltage to the auxiliary inverter 300 is adjusted such that the induced voltage results in a negative capacitive reactance that is equal to the positive inductive reactance seen by then main inverter 210. Consequently, the main inverter 210 is retuned, the hard-switching condition is removed, and the main inverter 210 is retuned to operation at the optimum switching condition, with close to or exactly zero reflected reactance as shown in FIG. 12c.

Simulations were performed on the inverters 210, 300 depicted in FIG. 11 in order to collect experimental results. For the purposes of these simulations, the transistors 606, 608, 656, 658 used in the inverters 210, 300 were the BSZ12DN20N 150V rated from Infineon. One of reasonable skill in the art will recognize that other transistors may be used. In addition, particular parameters were used as outlined in the table below:

TABLE 1

Main and auxiliary inverter parameters used for simulations

| Parameter | Value |
|---|---|
| L1 | 10 µH |
| L2 | 633 nH |
| L3 | 1 µH |
| C1 | 660 pF |
| C2 | 550 pF |
| C3 | 551 pF |
| LTX | 1.5 µH |
| RLoad | 0 – 30 Ω |
| XLoad | 0 ± j20 Ω |
| k | 0.5 |

Simulations were performed when the auxiliary inverter 300 was not present with the parameters listed above. In particular, the load (RLoad) was varied from 0Ω to 30Ω.

Figure 13A:
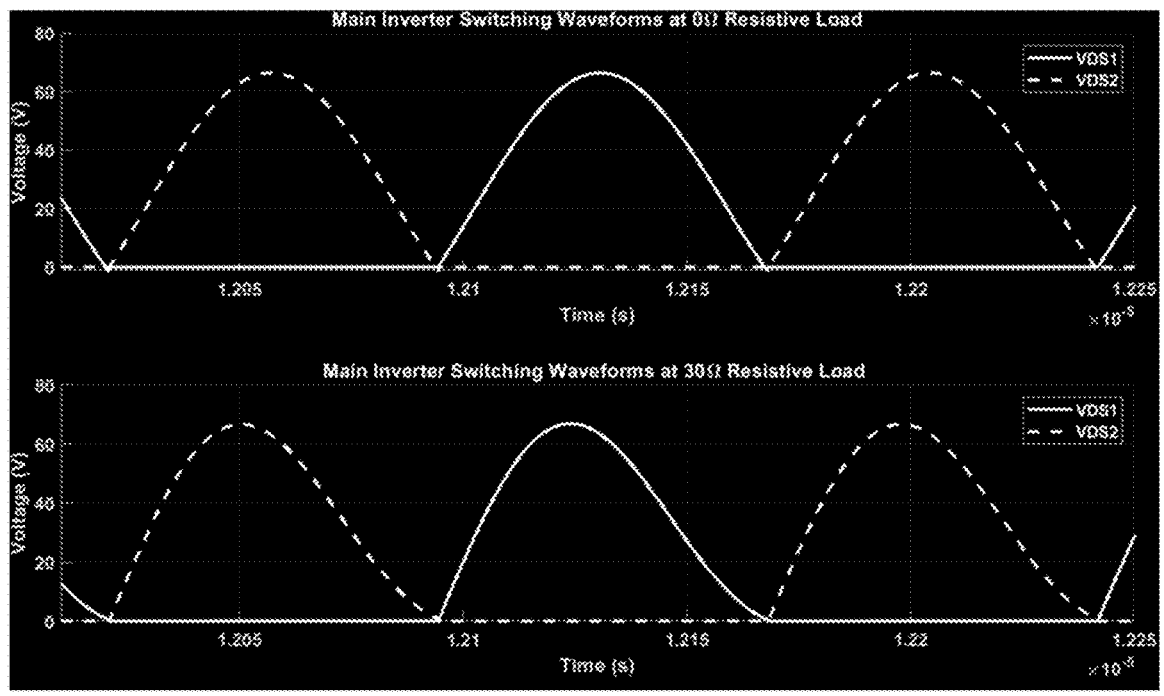
FIG. 13a illustrates voltage waveforms relative to load of a main inverter of a transmitter of a wireless power transfer system.
Figure 13B:
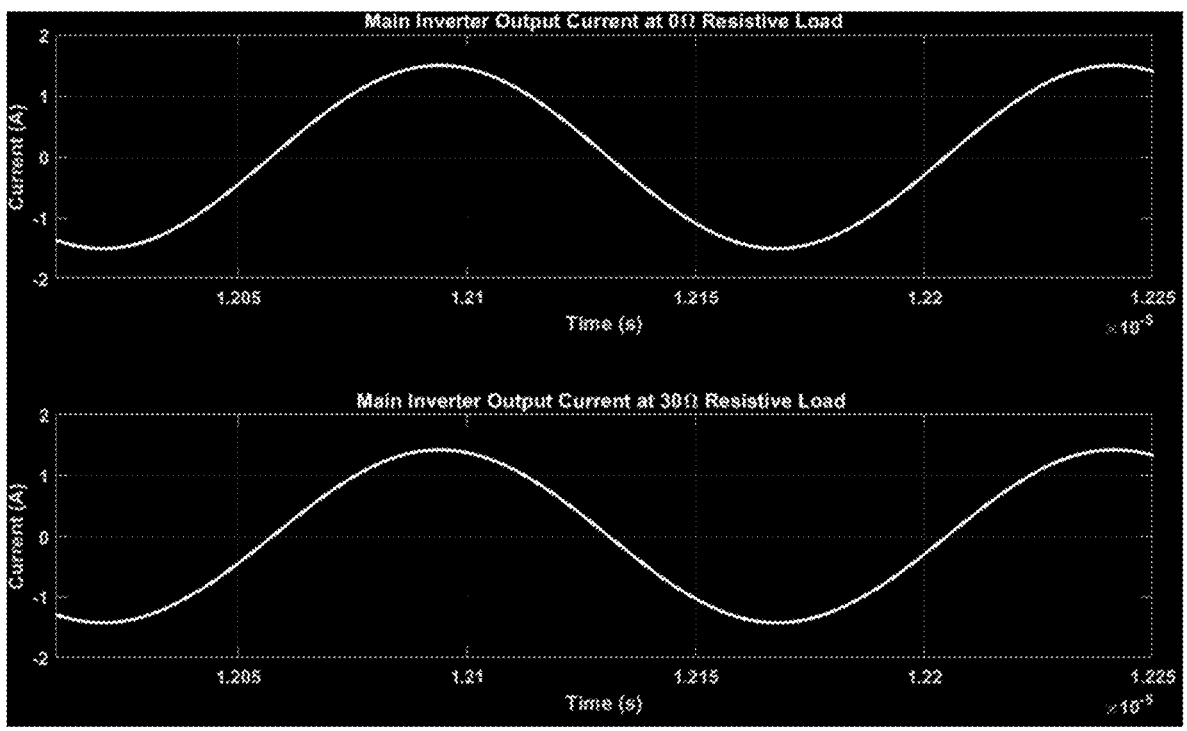
FIG. 13b illustrates current waveforms relative to load of a main inverter of a transmitter of a wireless power transfer system.

FIG. 13a illustrates voltage waveforms relative to load of the main inverter 210 when operating under normal conditions. In particular, waveforms of the voltage VDS1 at 0Ω and 30Ω, where VDS1 is the drain-source voltage of the transistor (switch) 606; and the voltage VDS2 at 0Ω and 30Ω, where VDS2 is the drain-source voltage of the transistor (switch) 608 are depicted. FIG. 13b illustrates the current waveforms relative to load of the main inverter 210 when operating under normal conditions. In particular, waveforms of the output current of the main inverter 210 at 0Ω and 30Ω are depicted. As illustrated, the main inverter 300 maintains a ZVS condition and near constant output current over the entire load resistance range (0 ohms to 30 ohms) as expected.

Figure 14A:
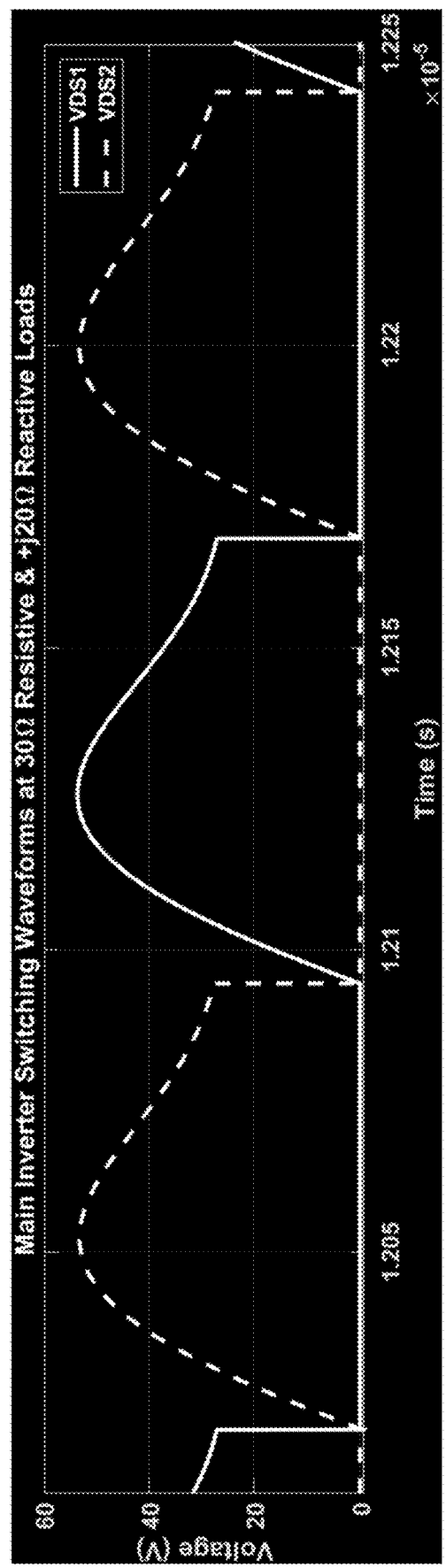
FIG. 14a illustrates voltage waveforms relative to load of a main inverter of a transmitter of a wireless power transfer system when a reactance is introduced.
Figure 14B:
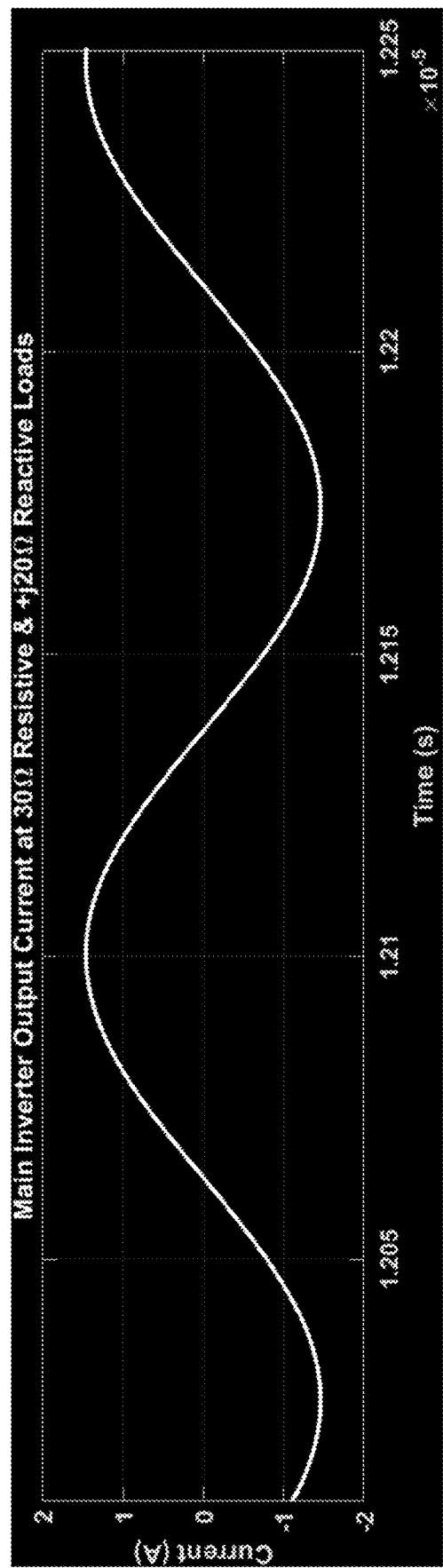
FIG. 14b is a current waveform relative to load of a main inverter of a transmitter of a wireless power transfer system when a reactance is introduced.

While the main inverter 210 may be able to handle a large variation in load resistance as shown in FIGS. 14a and 14b, when a "foreign" reactance is introduced, for example a reflected reactance due to a change in transmission medium, a ZVS condition is no longer maintained. FIG. 14a illustrates the voltage waveforms relative to load of the main inverter 210 when a reactance in introduced. In particular, waveforms of the voltage VDS1 at 30Ω when a reactance is introduced, where VDS1 is the drain-source voltage of the transistor (switch) 606; and the voltage VDS2 at 30Ω when a reactance is introduced, where VDS2 is the drain-source voltage of the transistor (switch) 608 are depicted. FIG. 14b illustrates the current waveform relative to load of the main inverter 210 when a reactance is introduced. In particular, the waveform of the output current of the main inverter 210 at 30Ω when a reactance is introduced is depicted. The reactance introduced is +j20. The introduction of the +j20 reactance causes the main inverter 210 to lose the ZVS condition while also causing a phase change in the main inverter's output current, both of which will cause a wireless power system comprising a transmitter with the main inverter 210 to become detuned.

To solve the problem of detuning the main inverter 210, the auxiliary inverter 300 is added to the transmitter of the wireless power transfer system. The auxiliary inverter 300 introduced is illustrated in FIG. 11. Waveforms of the inverters 210, 300 are illustrated in FIGS. 15a, 15b and 15c.

Figure 15A:
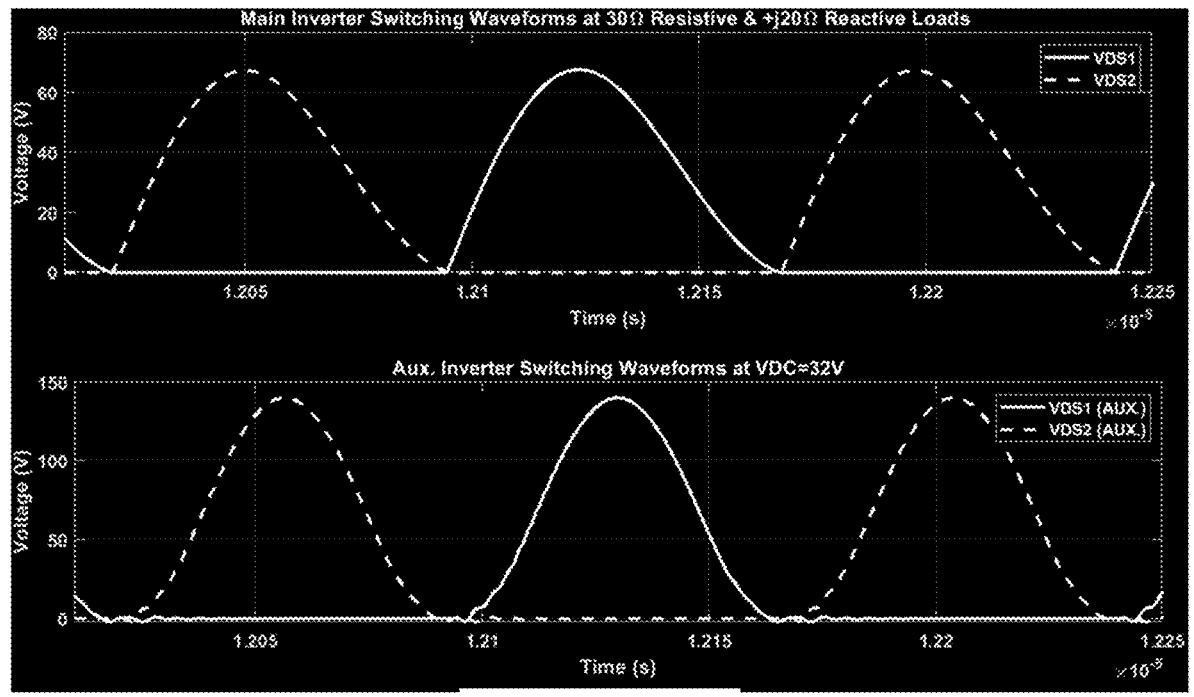
FIG. 15a illustrates voltage waveforms relative to load of a main inverter of a transmitter of a wireless power transfer system with an auxiliary inverter in accordance with an aspect of the disclosure when a reactance is introduced.

FIG. 15a is a voltage waveform relative to load of a main inverter of a transmitter of a wireless power transfer system with an auxiliary inverter when a reactance is introduced. In particular, waveforms of the voltage VDS1 at 30Ω when a reactance is introduced, where VDS1 is the drain-source voltage of the transistor (switch) 606 of the main inverter 210; and the voltage VDS2 at 30Ω when a reactance is introduced, where VDS2 is the drain-source voltage of the transistor (switch) 608 of the main inverter are depicted. In addition, the waveform of the voltage VDS1 at 30Ω when a reactance is introduced, where VDS1 is the drain-source voltage of the transistor (switch) 656 of the auxiliary inverter 300; and the voltage VDS2 at 30Ω when a reactance is introduced, where VDS2 is the drain-source voltage of the transistor (switch) 658 of the auxiliary inverter 300 are depicted.

Figure 15B:
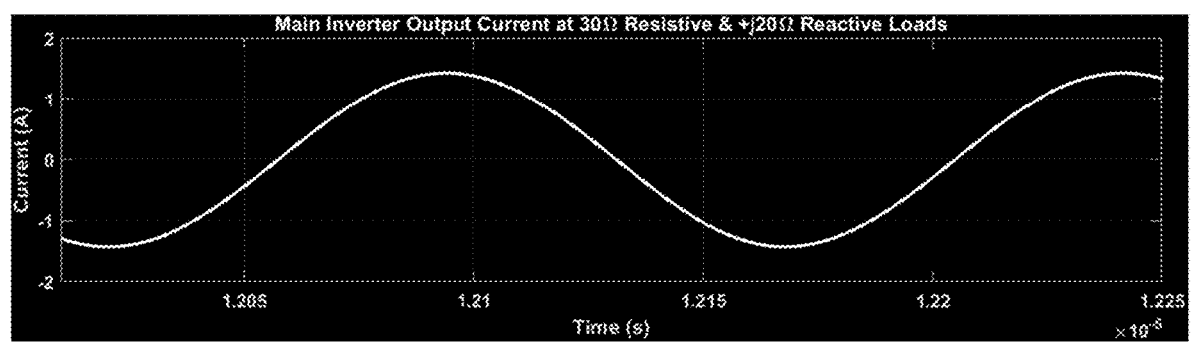
FIG. 15b is a current waveform relative to load of a main inverter of a transmitter of a wireless power transfer system with an auxiliary inverter in accordance with an aspect of the disclosure when a reactance is introduced.

FIG. 15b is a current waveform relative to load of the main inverter of a transmitter of a wireless power transfer system with the auxiliary inverter when a reactance is introduced. In particular, the waveform of the output current of the main inverter 210 with the auxiliary inverter 300 at 30Ω when a reactance is introduced is depicted.

Figure 15C:
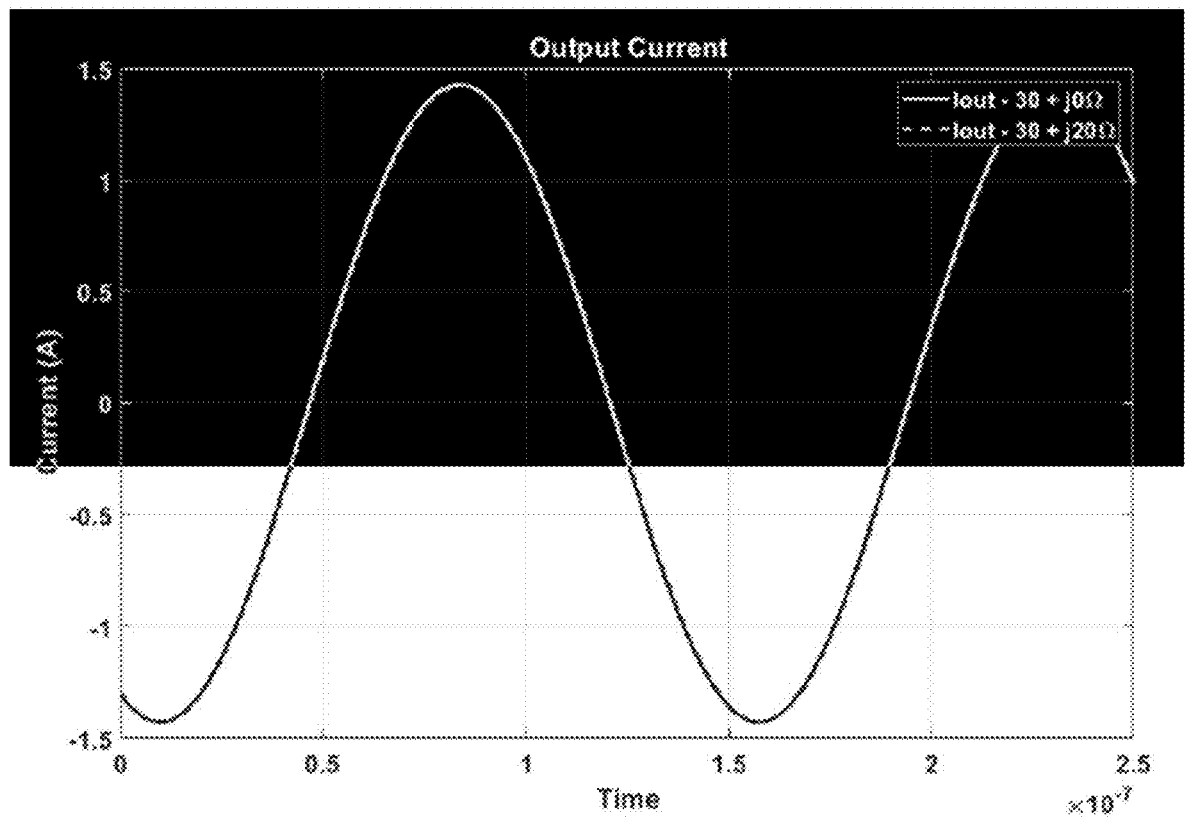
FIG. 15c is a current waveform relative to load of an auxiliary inverter in accordance with an aspect of the disclosure coupled to a main inverter of a transmitter of a wireless power transfer system when a reactance is introduced.

FIG. 15c is a current waveform relative to load of the auxiliary inverter coupled to the main inverter of a transmitter of a wireless power transfer system when a reactance is introduced. In particular, the waveform of the output current of the auxiliary inverter 300 coupled to the main inverter 210 at 30Ω when a reactance is introduced is depicted.

In this embodiment, the reactance introduced is +j20Ω.

As illustrated, when the reactance introduced is 0, the main inverter 210 operates at its nominal ZVS condition and constant output current condition. In addition, the DC voltage applied to the auxiliary inverter 300 is 0 V. A voltage will still be developed across the transistors 665, 668, i.e. MOSFETs, of the auxiliary inverter 300 due to the magnetic field (inductive) coupling with the main inverter 210, and the MOSFETs still achieve ZVS conditions.

A load reactance of +j20Ω, which corresponds to approximately 470 nH at an operating frequency 6.78 MHz, is then introduced. As illustrated in FIGS. 13a and 13b, this large reactance detunes the main inverter 210. However, with the auxiliary inverter 300 now added, the input voltage VDCAux is increased to 32 V and the main inverter 210 maintains a ZVS condition and constant output current. The auxiliary inverter 300 also maintains a ZVS condition as the non-linear output capacitance Coss of the transistors 656, 658, e.g. MOSFETs, has decreased as per the curves depicted in FIG. 10. Therefore, the non-linear capacitance has been used advantageously, thereby extending the impedance load range of the main inverter 210 which was originally ±30Ω resistive only, to the new range of ±30Ω resistive and ±j20Ω reactive.

While use of a single auxiliary inverter 300 with a main inverter has been described, one of skill in the art will appreciate that multiple auxiliary inverters 300 may be used.

For example, where a single auxiliary inverter 300 is sufficient to address a foreign reactance by a delta of +j20Ω, i.e. 0Ω to j20Ω, additional auxiliary inverters 300 could be added to address foreign reactance larger than +j20Ω. For example, given a foreign reactance that varies by a delta of j40Ω, a second auxiliary inverter 300 may be added to address the larger foreign reactance present in the main inverter 210. The larger the foreign reactance, the more auxiliary inverters 300 could be added to offset or address the foreign reactance in the system.

While exemplary circuit diagrams of the auxiliary inverter 300 have been provided and described, one of skill in the art will appreciate that other configurations are possible. As previously-described, the transistors 665, 668, e.g. MOSFETs, of the auxiliary inverter 300 may require diodes to create the required reduction in capacitance value. Accordingly in another embodiment, the auxiliary inverter 300 includes diodes to reduce capacitance values of the transistors (switches) 656, 658, e.g. MOSFETs, of the auxiliary inverter 300. One or more diodes may be electrically connected in parallel with each transistor 656, 658.

Although embodiments have been described above with reference to the figures, one of skill in the art will appreciate that variations and modifications may be made without departing from the scope thereof as defined by the appended claims.

What is claimed is:

1. An auxiliary inverter for use with a main inverter of a transmitter of a wireless power transfer system, the transmitter configured to transfer power to a receiver of the wireless power transfer system via electric or magnetic field coupling, the auxiliary inverter comprising:
    a coupling element;
    an output network electrically connected to the coupling element; and
    an adjustable power source electrically connected to the coupling element via the output network, an input voltage to the coupling element based on a detected signal,
    wherein the coupling element is configured to induce a voltage in the main inverter of the transmitter of the wireless power transfer system to manage reflected impedance at the main inverter, the induced voltage based on the input voltage to the coupling element.

2. The auxiliary inverter of claim 1, wherein the induced voltage is based on at least one of an input voltage from the adjustable power source, and a parameter of the output network.

3. The auxiliary inverter of claim 1, wherein the detected signal is an output current of the main inverter or a switching waveform of the main inverter.

4. The auxiliary inverter of claim 1, wherein the reflected impedance comprises a reflected reactance, and wherein the reflected reactance causes the main inverter to operate at a non-zero mode switching condition.

5. The auxiliary inverter of claim 1, wherein the coupling element is configured to induce the induced voltage in an inductive coil or a capacitive electrode of the main inverter.

6. The auxiliary inverter of claim 1, wherein the induced voltage at the main inverter is out of phase with a current at an output of the main inverter, or wherein the induced voltage at the main inverter is positively or negatively out of phase with a voltage of the main inverter.

7. The auxiliary inverter of claim 1, wherein the auxiliary inverter has a load-independent constant-current Class E configuration.

8. A method of managing reactance at a main inverter of a transmitter of a wireless power transfer system, the method comprising:
    inducing a voltage in the main inverter to at least partially negate effects of a reflected impedance at the main inverter; and wherein the induced voltage is based on an input voltage from an adjustable power source to a coupling element of an auxiliary inverter, the input voltage based on a detected signal.

9. The method of claim 8, wherein the detected signal is an output current of the main inverter or a switching waveform of the main inverter.

10. The method of claim 8, further comprising detecting the signal, wherein detecting the signal comprises detecting an output current of the main inverter or detecting a switching waveform of the main inverter.

11. The method of claim 8, wherein the reflected impedance causes the main inverter to operate at a non-zero mode switching condition.

12. The method of claim 8, further comprising tuning the auxiliary inverter, wherein tuning comprises adjusting the input voltage of the auxiliary inverter.

13. The method of claim 12, wherein adjusting the input voltage comprises adjusting the input voltage until a zero voltage switching condition is achieved at least at one of the auxiliary inverter and the main inverter.

14. A method of managing reflected impedance at a main inverter of a transmitter of a wireless power transfer system, the method comprising:
    detecting a signal of the main inverter of the transmitter of the wireless power transfer system; and
    adjusting a voltage induced in the main inverter of the transmitter of the wireless power transfer system based on the detected signal to at least partially negate effects of reflected impedance at the main inverter; and
    adjusting the voltage induced further comprises adjusting a voltage induced by a coupling element of an auxiliary configured to induce a voltage in the main inverter via electric or magnetic field coupling; and
    wherein the coupling element is electrically connected to a power source via an output network, and wherein adjusting the voltage induced by the coupling element comprises at least one of: adjusting input voltage from the power source; and adjusting a parameter of the output network.

15. The method of claim 14, wherein the signal comprises output current of the main inverter or a switching waveform of the main inverter.

16. A transmitter for a wireless power transfer system, the transmitter comprising a power source, a transmit element configured to transfer power to a receive element of a receiver via magnetic or electric field coupling, and a main inverter electrically connected between the power source and transmit element, the main inverter configured to convert direct current (DC) to alternating current (AC), the transmitter further comprising at least one auxiliary inverter of claim 1.

17. A wireless power transfer system comprising the transmitter of claim 16, and a receiver comprising a load electrically connected to a receive element, the receive element for extracting power from a field generated by the transmit element via electric or magnetic field coupling.

18. A method of managing reactance at a main inverter of a transmitter of a wireless power transfer system, the method comprising: inducing a voltage in the main inverter to at least partially negate effects of a reflected impedance at the main inverter; and further comprising tuning an auxiliary inverter, wherein tuning comprises adjusting the input voltage of the auxiliary inverter.

19. The method of claim 18, wherein adjusting the input voltage comprises adjusting the input voltage until a zero voltage switching condition is achieved at least at one of the auxiliary inverter and the main inverter.

* * * * *